US011440149B2

(12) United States Patent
Jarvis et al.

(10) Patent No.: US 11,440,149 B2
(45) Date of Patent: Sep. 13, 2022

(54) APPARATUS, SYSTEM AND METHOD FOR ADHESIVE FIXTURING OF A WORK PIECE

(71) Applicant: Advanced Simulation Technology, Incorporated, Aston, PA (US)

(72) Inventors: Matthew T. Jarvis, Newark, DE (US); Mark A. Rogers, Newark, DE (US); Steven B. Lelinski, Kennett Square, PA (US); Alvin Andrew Potter, Media, PA (US)

(73) Assignee: Advanced Simulation Technology, Incorporated, Aston, PA (US)

( * ) Notice: Subject to any disclaimer, the term of this patent is extended or adjusted under 35 U.S.C. 154(b) by 0 days.

(21) Appl. No.: 17/218,701

(22) Filed: Mar. 31, 2021

(65) Prior Publication Data
US 2021/0229229 A1 Jul. 29, 2021

Related U.S. Application Data

(63) Continuation of application No. 16/102,403, filed on Aug. 13, 2018, now Pat. No. 10,994,384.

(60) Provisional application No. 62/546,996, filed on Aug. 17, 2017.

(51) Int. Cl.
*B23Q 3/08* (2006.01)
*B23Q 3/10* (2006.01)
*C09J 5/00* (2006.01)

(52) U.S. Cl.
CPC ............... *B23Q 3/084* (2013.01); *B23Q 3/10* (2013.01); *C09J 5/00* (2013.01); *B23Q 2703/02* (2013.01); *C09J 2301/416* (2020.08)

(58) Field of Classification Search
CPC ...... B23Q 3/10; B23Q 3/084; B23Q 2703/02; C09J 2301/416; C09J 5/00
See application file for complete search history.

(56) References Cited

U.S. PATENT DOCUMENTS

| 2004/0026023 | A1* | 2/2004 | DeMeter | B27G 11/02 |
| | | | | 156/247 |
| 2014/0379129 | A1* | 12/2014 | Edsinger | B25J 9/0096 |
| | | | | 700/254 |
| 2021/0229229 | A1* | 7/2021 | Jarvis | B23Q 3/10 |

FOREIGN PATENT DOCUMENTS

JP 3148080 U * 1/2009

OTHER PUBLICATIONS

Machine Translation of JP-3148080-U (Year: 2009).*

* cited by examiner

*Primary Examiner* — Daniel McNally
(74) *Attorney, Agent, or Firm* — Robert J. Yarbrough; Lipton, Weinberger & Husick

(57) ABSTRACT

An apparatus, system and method for adhesive fixturing include UV light sources in alignment with gripper pins communicating through a fixture. A bus connector operably connects the UV light sources to a control box of the workcell. The control box controls the illumination of the UV light sources through the bus connector.

18 Claims, 15 Drawing Sheets

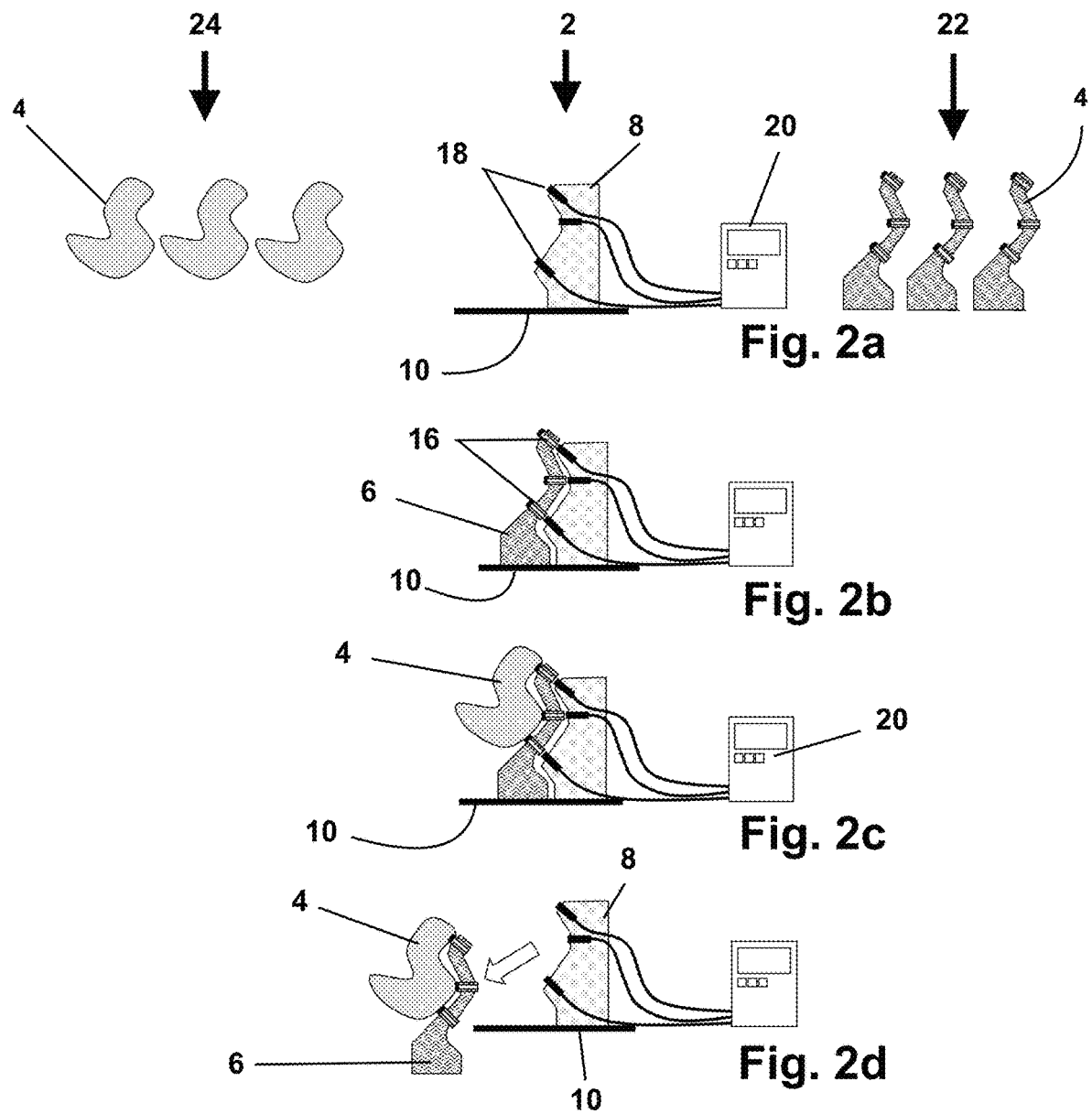
Prior Art

Prior Art

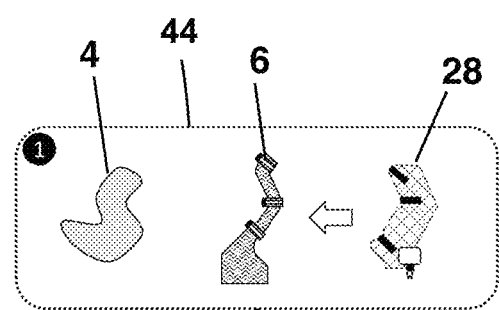
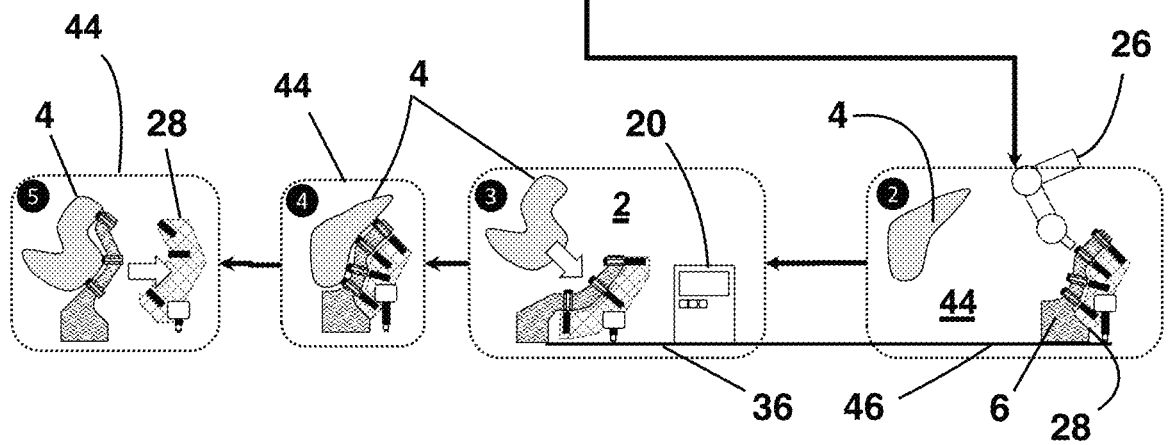
Fig. 7A
Fig. 7E   Fig. 7D   Fig. 7C   Fig. 7B

APPARATUS, SYSTEM AND METHOD FOR ADHESIVE FIXTURING OF A WORK PIECE

I. STATEMENT OF RELATED APPLICATIONS

This application is entitled to priority from U.S. Provisional patent Application No. 62/546,996 filed Aug. 17, 2017 and U.S. Non-Provisional patent application Ser. No. 16/102,403 filed Aug. 13, 2018, which applications are hereby incorporated by reference as if set forth in full herein.

II. BACKGROUND OF THE INVENTION

A. Field of the Invention

The Invention is an apparatus, system and method for adhesive fixturing; namely, for adhering a work piece to a fixture for the purpose of performing machining operations on the work piece. The apparatus and method of the Invention speeds the setup of an automated fixturing operation using UV adhesive and promotes the quick and efficient use of very expensive automated workcell equipment.

B. Statement of the Related Art

In any machining operation, including computer numerical control ('CNC') machining, a machine tool changes the shape of a work piece in a precisely controlled manner to create a machined product. For the machine tool to accurately shape the work piece, the work piece must be securely and rigidly held in a known position with respect to the machine tool. In general, the work piece is securely and rigidly attached to a 'fixture' and the fixture is securely and rigidly attached to the stage or table of the machine tool. The machine tool then can perform the machining operation on the work piece.

The process of attaching a work piece to a fixture is known as 'fixturing'. One manner of fixturing a work piece, particularly an irregularly shaped or delicate work piece, is to attach the work piece to a fixture using adhesives. Adhesive fixturing allows a work piece to be held by its surfaces, which may not be possible with traditional workholding methods, such as clamping. The adhesive may be 'UV adhesive' cured by ultraviolet light.

In typical prior art UV adhesive fixturing, a fixture defines discrete 'adhesive sites.' The adhesive sites are the locations on the fixture that will be attached to the work piece using the UV adhesive. Each adhesive site is associated with a 'gripper pin.' A gripper pin is an object that is transparent to UV light and that communicates through the body of the fixture to the adhesive site. Gripper pins commonly are composed of sapphire, which is UV transparent. The end of each gripper pin that will engage the work piece is coated with UV adhesive.

During a fixturing operation, each fixture engages a 'support structure.' The support structure holds 'UV delivery endpoints' in the proper locations and orientations to align with the gripper pins of the fixture. The UV delivery endpoints selectably emit UV radiation. Alignment of the gripper pins and UV delivery endpoints is necessary for the subsequent curing of the adhesive by UV light. The UV delivery endpoints are connected by electrical cables (in the case of LED light sources) or by fiber-optic or fluid-filled tubes (in the case of a central light source) to a 'control box.' The control box controls the illumination of the UV delivery endpoints.

Prior art automated fixturing using UV adhesive typically utilizes a 'workcell'. A 'workcell' is an automated apparatus that uses one or more precision robotic manipulators to align the fixture with the support structure and the work piece with the fixture. In the prior art, the workcell must be set up for each and every combination of fixture, work piece, and orientation of the work piece. Setup of the workcell includes rigidly attaching the 'support structure' at a known location within the workcell. Setup also includes a human operator manually placing the UV delivery endpoints with respect to the support structure so that the UV delivery endpoints will align with the gripper pins on the fixture. Setup may include a validation step, as described below.

To fixture a work piece using the fully set-up workcell, a robotic manipulator grips the fixture and places the fixture in alignment with the support structure so that the gripper pins are aligned with the UV delivery endpoints. Either the same or a different robotic manipulator grips the work piece and places the work piece in the desired orientation with respect to the fixture.

After the fixture and work piece are in alignment in the workcell, the control box activates the UV light sources. The UV delivery endpoints direct the UV light through the UV transparent gripper pins to the adhesive sites. The light strikes the UV adhesive, which cures and bonds the work piece to the fixture. The work piece is now fixtured and ready for further machining steps. A robotic manipulator grips the combination of the work piece and fixture and removes the combination from the workcell for further machining. The support structure is ready to receive another fixture and work piece, but only the fixture and work piece that the workcell is set up to fixture. The work cell cannot fixture any other work piece or use any other fixture without a new setup of the work cell.

If the UV delivery endpoints are not properly aligned, or if any optical obstruction exists anywhere in the optical system, the UV light emitted by the UV delivery endpoints will not be able to reach or properly cure the UV adhesive. An improperly cured adhesive site may cause adhesive failure during the machining operation, resulting in damage to the work piece, the fixture or the machine tool. To avoid adhesive failure, the workcell may perform a validation step, in which the workcell causes a robotically operated photo-detector to check each gripper pin for UV light at each adhesive site prior to placing the work piece on the fixture. Where validation is used, the prior art validation step is part of the setup for each combination of fixture, work piece and work piece orientation. The prior art validation step occurs within the workcell and ties up valuable workcell time.

In the prior art validation step, the photodetector either does or does not detect adequate UV light from each gripper pin in a pass-or-fail determination. If the photodetector detects adequate UV light from each gripper pin, then the fixture passes and the work piece is attached to the fixture. If the photodetector does not detect adequate UV light, then the system is adjusted or repaired.

For a prior art fixturing system, if the operator wishes to fixture work pieces using a different combination of fixture, work piece and orientation of the work piece, the operator must go through the setup procedure again for each different combination. The operator must repeat the setup procedure for each succeeding combination of fixture, work piece and work piece orientation. Each of the setup steps described above occurs within the workcell, tying up the workcell and preventing the workcell from performing other tasks while the setup is underway.

Optionally, the fixture may be a compound fixture comprising a first fixture and a second fixture. Once the work piece is adhered to the first fixture, the second fixture is attached to the first fixture, as by threaded fasteners. The human operator manually attaches additional UV delivery endpoints to the second fixture and to the control box or to another control box. The control box activates the additional UV endpoints, curing the UV adhesive and attaching the work piece to the second fixture. The compound fixture may be complex and may comprise more than the first and second fixtures. Compound fixtures are commonly used to fixture work pieces in the aerospace industry.

When the machining operations are complete, the work piece can be removed from the fixture(s) by applying a low heat to melt the UV adhesive.

Prior art apparatus for producing and delivering ultraviolet radiation to a fixture falls into one of two categories. In the first, as seen in the OmniCure S Series by Excelitas Technologies of Waltham Mass., a single light source such as a mercury lamp sits inside a closed unit and light is guided to the adhesive sites by fiber-optic or fluid filled cables. In the second, as demonstrated by the OmniCure LX Series, also by Excelitas Technologies, a single control box is connected to ultraviolet LED (light emitting diode) lamps by electrical cables. In both cases a single control box is physically and separately connected to each UV delivery endpoint to which ultraviolet radiation is delivered.

The prior art UV adhesive fixturing system and process described above has disadvantages. Principal among them is that the setup process occurs within the workcell and ties up the very expensive time of very expensive robotic machinery in the workcell. Under the prior art system described above, each work piece and fixturing combination must be separately set up within the workcell and the workcell can only fixture one combination of fixture, work piece and orientation of the work piece without a new setup. This requirement for a new setup for each combination of fixture, work piece and orientation of the work piece is a serious impediment to automated fixturing. The issue is compounded for compound fixtures, in which manual setup steps must occur within the workcell for each work piece. In addition, the prior art setup steps occur within the workcell, tying up very expensive workcell time.

The prior art does not teach the Invention.

III. BRIEF DESCRIPTION OF THE INVENTION

The Invention is an automated apparatus, system and method for adhesive fixturing. The Invention has the effect of physically removing prior art setup steps from the workcell, simplifying set up and freeing workcell time for other activities. The net result is more efficient use of the very expensive workcell, more through put of the workcell and reduced unit cost for each fixtured work piece. The result is also production flexibility—the removed setup steps may be performed at a location remote from the workcell, even miles or hundreds of miles away, and at a time remote from the workcell setup, even at a time days or years before the workcell setup. The Invention may utilize adaptive placement of a work piece on a non-adaptive fixture, as described by U.S. Pat. No. 9,746,848 issued Aug. 29, 2017, which is incorporated by reference as if set forth in full herein.

The apparatus of the Invention includes a support structure that incorporates into the support structure one or more UV light sources, a support structure controller for the UV light sources, and a bus connector for the UV light sources, collectively known as a 'UV delivery assembly.' The bus connector may include power connections to operate the support structure controller and to operate the UV light sources. The bus connector and support structure controller allow the UV delivery assembly to be attached to the fixture outside of the workcell and to then connect to a workcell bus when the combination of the fixture and UV delivery assembly are placed in the workcell. The system of the Invention includes a workcell bus that is attached to the control box and is configured to connect operably to the support structure controller through the bus connector when the UV delivery assembly is attached to the workcell. Incorporation of the UV light sources and associated bus connector into the support structure occurs during preparation of the UV delivery assembly, not during setup of the workcell.

The structure of the Invention eliminates workcell setup steps by allowing attachment of the fixture to the support structure outside of the workcell and prior to workcell set up.

The structure of the Invention removes setup steps from the workcell by allowing the validation step to be performed outside of the workcell. An operator or automated system can validate the attached combination of the support structure, UV light sources and fixture by attaching the bus connector to a validation bus, actuating the UV light sources, and measuring the UV light emitted from the gripper pins without the support structure or fixture being present in the workcell. Removing the validation step from the workcell frees the very expensive workcell for other tasks.

In the apparatus, system and method of the Invention, a support structure features a plurality of UV light sources that attach to and are supported by the support structure. The UV light sources may take the form of ultraviolet LED lamps. The UV light sources are aligned with the gripper pins of a fixture when the fixture and the support structure are in alignment. The fixture is configured to rigidly support a work piece for machining operations.

The UV light sources are operably connected to a support structure controller, preferably by a wired connection. The support structure controller is a component of the UV delivery assembly and includes one or more embedded microprocessors and appropriately programmed computer memory. The support structure controller is connected to a bus connector, which also is a component of the UV delivery assembly. The bus connector is configured to connect to a workcell bus that is part of the workcell. The workcell bus is configured to transmit both power and data to the bus connector. The bus connector may connect to the workcell bus by electrically conductive pins, blades, wires, surfaces, connectors, or any other mechanism known in the art to transfer electrical power and data from one electronic device to another. The plurality of UV light sources, the support structure controller and the bus connector are a part of the UV delivery assembly.

The support structure controller is configured to receive a command from a control box over the workcell bus and bus connector and to implement that command by selectably illuminating the UV light sources.

The workcell bus is a part of the workcell and is operably connected to a control box. The control box is configured to provide instructions to the support structure controller and to thus control the UV light sources when the bus connector is connected to the workcell bus. The control box is configured to perform all of the functions of a conventional UV adhesive control box; namely, activating the UV light sources in any manner required to harden the UV adhesive, such as activating the UV light sources in multiple timed stages or sequences, and managing the temperature, intensity, and operational life of the UV light sources.

Optionally, the bus connector may take the form of a wireless connection to the workcell bus. The wireless connection may utilize radio, light, sound or vibration for communication between the control box and the UV light sources. In the wireless connection embodiment, the workcell bus may provide power to illuminate the UV light sources or one or more electrical storage cells on board the support structure may provide power.

For the apparatus of the Invention to fixture a work piece, the UV delivery assembly comprising the support structure, including the support structure controller, the bus connector and the UV light sources, is physically attached to a fixture. Any technique known in the art may attach the fixture to a support structure, such as a latch, a pin, a detent, a magnetic clamp or a pneumatic clamp. The attachment occurs outside of the workcell. The assembled fixture and the UV delivery assembly subsequently are physically placed in the workcell and the bus connector is electrically connected to the workcell bus. Setup is complete and the workcell is ready to fixture the work piece.

Because the assembly of the UV delivery assembly to the fixture occurs outside of the workcell, multiple types of fixtures can be attached to multiple types of UV delivery assemblies separated in space and time and parallel to operations of the workcell. As an example, the workcell can be fixturing a second work piece while the assembly of the UV delivery assembly and fixture for a first work piece is proceeding separately.

From the foregoing, the task of reconfiguring the workcell to fixture different work pieces is as simple as placing the assembled fixture and UV delivery assembly in the workcell and attaching the bus connector to the workcell bus. The control box can automatically handle other configuration tasks, such as recognizing which UV delivery assembly is attached and hence which work piece will be fixtured. The low-value task of assembling each UV delivery assembly and assembling the UV delivery assembly to the fixture is separated from the workcell, freeing the workcell for high-value tasks; namely, fixturing work pieces.

The Invention has application for compound fixtures. A second fixture is configured for attachment to a first fixture. The first fixture is attached to a first UV delivery assembly outside the workcell, as described above. The second fixture is attached to a second UV delivery assembly outside of the workcell, also as described above. The combination of the first fixture and the first UV delivery assembly are placed in the workcell and the bus connector connects the support structure controller for the first UV delivery assembly to the workcell bus and hence to the control box. The workcell robotically places the work piece in the desired orientation in contact with the first fixture. The control box commands the support structure controller for the first UV delivery assembly to illuminate the gripper pins and hence the UV adhesive, curing the UV adhesive and attaching the work piece to the first fixture. The robot arm holding the work piece or other robot effector is withdrawn from the work piece and the second fixture and second UV delivery assembly are attached to the first fixture, as by threaded fasteners. The second UV delivery assembly may include a second support structure controller and a second bus connector. The second bus connector is connected to the first bus connector of the first UV delivery assembly and hence to the workcell bus and the control box. The control box commands the second support structure controller to illuminate the UV light sources, curing the UV adhesive between the second fixture and the work piece. The work piece now is secured to the compound fixture defined by the first and second fixtures and is removed from the workcell. The first and second UV delivery assemblies are removed from the first and second support fixtures and the first and second bus connectors are separated. The work piece, now supported by the compound fixture, is ready for machining operations.

The above process can be repeated for any number of physically and electrically connected fixtures defining a compound fixture. The above apparatus, system and method for compound fixture saves workcell time compared to the prior art by moving setup operations outside the workcell.

The Invention also allows the validation task of evaluating the UV light output of the UV delivery assembly and fixture combination to be separated from the workcell, freeing workcell time for fixturing work pieces. The validation step may be a pass-fail evaluation of whether each fixture and support structure combination emits adequate UV light. The pass-fail evaluation is particularly useful where the work piece is of high value and where each fixture and support structure combination must be validated each time before a work piece is attached to the fixture.

The validation step may be more than a pass-fail evaluation. LED lamps acting as UV light sources may deteriorate with time and usage, with light output decaying in a manner that can be modeled and predicted. The validation system may capture the UV light emission data for each gripper pin of each fixture and support structure combination during each validation step. The UV light emission data may include UV intensity and also may include wavelength. The validation system also may consider any other information that is available and useful in determining or predicting the performance of the UV light sources, for example the temperature of a LED lamp. The validation system may assemble a database of performance data for each support structure and may evaluate the performance data using the statistical techniques used to evaluate cutting tool wear in machining operations. The validation system may compare the performance of each UV light source to the model of the expected behavior of the LED lamps as the LED lamps age and deteriorate. The validation system thus can predict the remaining useful life of the LED lamps.

Based on the prediction, the validation system may determine the frequency of needed validations for the LED lamp and its associated support structure. For a young and healthy LED lamp and support structure, the validation system may determine that the LED lamp and associated support structure need only be validated at a frequency of every tenth, hundredth, or any other number of occasions that the LED lamp and associated support structure are attached to a fixture. Conversely, for a LED lamp nearing the end of its useful life, the validation system may determine that the LED lamp and support structure will be validated at every occasion that the LED lamp and support structure are attached to a fixture.

The validation system also may extend the life of a deteriorating LED lamp. The validation system may determine that increasing the electrical power to the deteriorating LED lamp will cause the LED lamp to emit more UV light. The validation system also may determine that extending the duration of illumination of the LED light source will cause the LED lamp to emit an adequate amount of UV light to effectively attach the work piece to the fixture. The validation system may load instructions specifying the increased electrical power or duration of illumination or the frequency of validation to the support structure controller. The support structure controller then will control the illumination of the LED light source for the required increased power or duration of illumination. The validation system also may load the results of a validation step to the support structure controller and the support structure controller may store the database of performance data for each UV light source of the support structure. The support structure controller when connected to the validation system may advise the validation system of the results of past validations and of the requirement for frequent or infrequent validation of the LED light source and associated support structure.

Definitions

The following are definitions of terms used in this document:

'Adhesive fixturing' means adhering a work piece to a fixture for the purpose of performing machining operations on the work piece. 'Adhesive fixturing' using the apparatus, system and method of the Invention occurs on the workcell stage of a workcell.

'Adhesive site' means a location on a fixture that will be adhered to a work piece.

'Bus connector' means a connector attached to the support structure that is configured for connection to a workcell bus when the support structure is attached to the workcell. The 'bus connector' provides the connection between the support structure controller and the control box through the workcell bus. The 'bus connector' may be manually connected to the workcell bus by a human operator or by a robot or may connect automatically when the support structure is attached to the workcell.

'Compound fixture' means a first fixture and a second fixture that are connected together to define the compound fixture. The compound fixture may comprise two, three or more fixtures that are connected together.

'Compound support structure' means a first support structure and a second support structure that connect together and to a fixture to support UV light sources in alignment with the gripper pins of the fixture. The compound support structure may comprise two, three or more support structures that connect together.

'Control Box' means a controller for the UV delivery endpoints and a controller for any other UV light source to cure the UV adhesive. The term 'control box' is used in the industry to refer to any controller for UV light sources to cure UV adhesive and does not indicate a 'box' or any other shape for the controller. A 'control box' may be of any shape and may be integral to a workcell.

'Fixture' means an object that supports a work piece during machining operations. A work piece is attached to a fixture and the fixture is attached to the table or stage of a machine tool for machining operations.

'Fixturing' means the process of attaching a work piece to a fixture at a desired location and orientation to conduct additional machining operations on the work piece. Fixturing may involve adaptive placement of a work piece on a fixture, such as a non-adaptive fixture, as described in the documents incorporated by reference.

'Gripper Pin' means a substantially UV transparent component of a fixture that transmits UV light from a UV light source to the adhesive site to cure the UV adhesive.

'Machined Product' means a work piece that has undergone a machining operation by a machine tool.

'Machine Tool' means a manufacturing apparatus having automated control of any shaping, subtractive or additive manufacturing process that describe a series of movements, and includes milling, turning, drilling, grinding, electric discharge machining, laser cutting, water jet cutting, welding, friction stir welding, ultrasonic welding, flame cutting, plasma cutting, bending, spinning, punching, pinning, gluing, fabric cutting, sewing, tape and fiber placement, routing, picking and placing, sawing and 3D printing. As used in this document 'machine tool' also refers to any other automated manufacturing technology that utilizes a series of movements of a work piece or of a tool with respect to a work piece or of a work piece and a tool with respect to each other for the purpose of changing the shape of the work piece.

'Setup' of a workcell using the Invention means attachment of a combination of a support structure and a fixture to the stage of the workcell and connection of the bus connector to the workcell bus. Once setup is complete, the workcell is ready to robotically place the work piece on the fixture and to adhesively attach the work piece to the fixture.

'Support structure' means a structure that supports UV light sources in alignment with the gripper pins of the fixture so that when the work piece is placed in the desired location on the fixture on the workcell stage and the UV light sources are activated, UV light from the UV light sources travels through the gripper pins and cures UV adhesive at the adhesive sites, attaching the work piece to the fixture.

'Support Structure Controller' means an electronic device including one or more microprocessors that is supported by the support structure, that is part of the UV delivery assembly, and that is configured to receive commands from a control boxes through a bus connector communicating with a workcell bus. The 'support structure controller' controls one or more UV light sources on the support structure. Compound support structures may feature two or more support structure controllers, each of which communicates with the control box through the workcell bus and the bus connector.

'UV Adhesive' means an adhesive that is cured by exposure to ultraviolet (UV) light.

'UV Light Source' means a source for UV light that may be attached to a fixture and aligned with a gripper pin on the fixture. The 'UV light source' is illuminated under the control of a control box to cure UV adhesive disposed between the gripper pin and the work piece, attaching the work piece to the fixture. The 'UV light source' is selectably connectable to a control box through a bus connector, allowing the 'UV light source' to be connected to the fixture at a location outside of the workcell and off of the workcell stage. The 'UV light source' may be an LED lamp.

'Validation' means the process of checking the UV light output at each gripper pin prior to attaching a work piece to a fixture. Where the fixture is assembled to the UV light sources and support structure in the workcell as in the prior art, 'validation' also must occur within the workcell. Where the fixture is assembled to the UV delivery assembly outside of the workcell, 'validation' may occur outside of the workcell, freeing the workcell for other tasks.

'Workcell' means a robotic fixturing system under automatic control. The workcell uses precision robots to place a work piece with respect to a fixture attached to the workcell stage. The control box of the workcell activates the UV light sources to cure the UV adhesive and attach the work piece to the fixture.

'Workcell bus' is a communications connection within the workcell between the control box and a bus connector attached to the support structure. The 'workcell bus' also may carry electrical power for the support structure controller and the UV light sources.

'Workcell stage' is a location within the workcell to which the fixture is attached for automated fixturing of the work piece to the fixture.

'Work Piece' means an object that is or will be converted from an un-machined state to a machined state by a machining operation. A fixture supports the work piece for the machining operation.

IV. BRIEF DESCRIPTION OF THE DRAWINGS

FIG. 2A is a schematic view of a prior art adhesive fixturing system setup.

FIG. 2B is a schematic view of a prior art system with the fixture attached to the support structure on the stage of the workcell.

FIG. 2C is a schematic view of a prior art system with the work piece attached to the fixture and support structure.

FIG. 2D is a schematic view of the prior art system with the work piece and attached fixture being removed from the workcell.

FIG. 6A shows selection of work pieces, UV delivery assemblies and fixtures from the respective queues.

FIG. 6B shows attachment of a fixture to a UV delivery assembly outside of the workcell.

FIG. 6C shows attachment of the work piece to the fixture inside the workcell under the control of the control box.

FIG. 6D shows removal of the attached work piece, fixture and UV delivery system from the workcell.

FIG. 7A through 7E are an illustrated schematic flow chart including the validation step.

FIG. 7A illustrates selecting the work piece, fixture and UV delivery assembly from their respective queues.

FIG. 7B shows the validation step outside of the workcell.

FIG. 7C shows fixturing inside the workcell.

FIG. 7D shows removal of the work piece, fixture and UV delivery system from the workcell.

FIG. 7E shows separation of the UV delivery system.

V. DESCRIPTION OF AN EMBODIMENT

The Invention is an apparatus, system and method of adhesive fixturing in a workcell 2. The apparatus, system and method of the Invention allows a single robotic positioning workcell 2 to perform adhesive fixturing of several different combinations of work piece 4 and fixture 6 without requiring a time-consuming setup on the workcell 2 for each change in work piece 4 or fixture 6. The apparatus, system and method of the Invention also reduces the amount of time required for the workcell 2 to fixture a work piece 4 by moving operations such as attachment of the fixture 6 to the support structure 8 and validation of the fixture and support structure combination to a location outside of the workcell 2.

Figure 1:
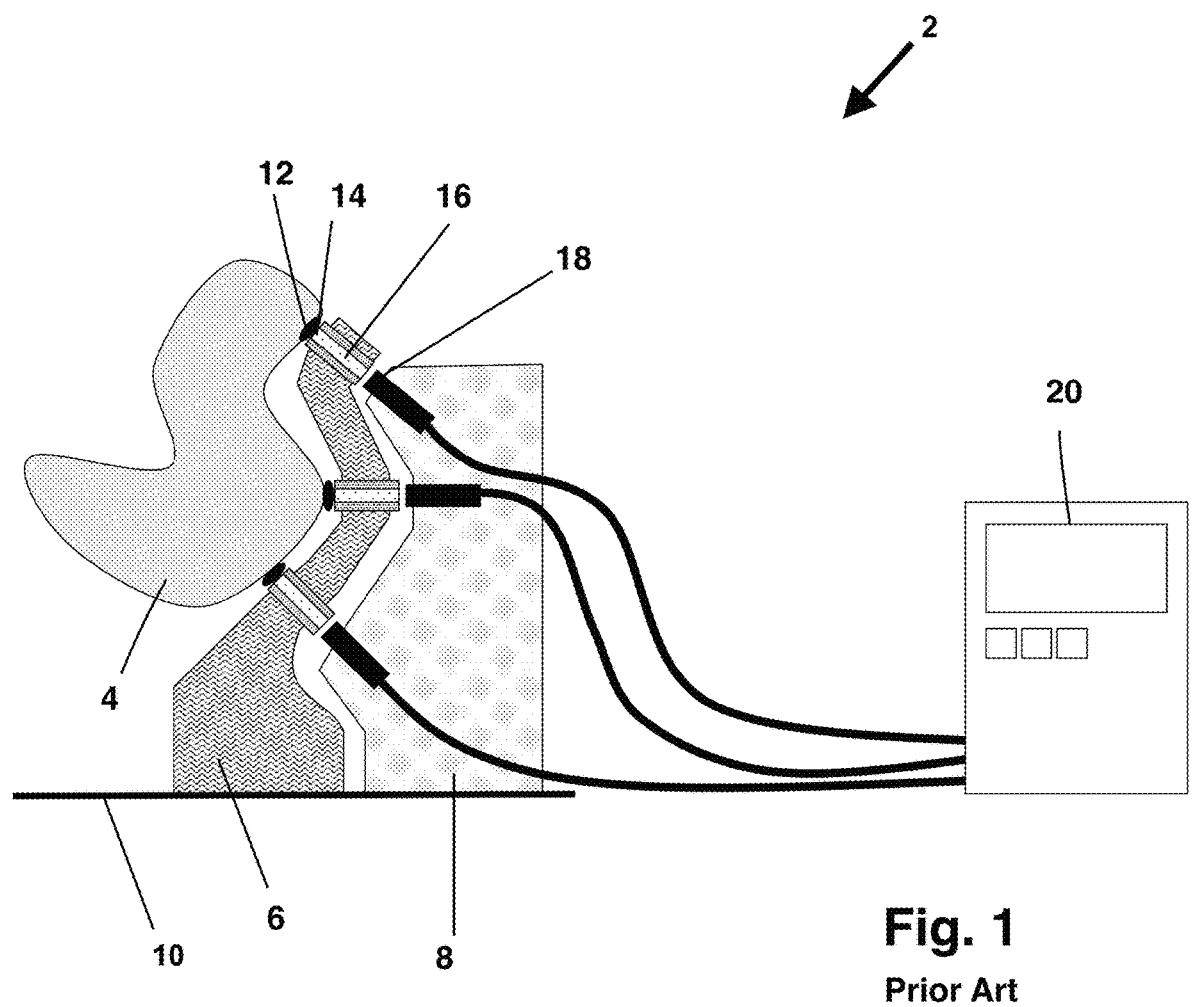
FIG. 1 is a schematic view of a prior art adhesive fixturing system.

FIGS. 1, 2A-2D and 3A-3C illustrate a prior art adhesive fixturing system. FIG. 1 shows a typical prior art apparatus. A support structure 8 is attached to a workcell stage 10 inside a workcell 2 and UV delivery endpoints 18 are attached to the support structure 8 and to the control box 20. The UV delivery endpoint 18 is an ultraviolet LED lamp or the end of a fiber-optic or fluid-filled channel. Each UV delivery endpoint 18 is connected to a control box 20 by an individual electrical cable in the case of an ultraviolet LED lamp, or by an individual optical cable in the case of a central light source. The support structure 8 aims the UV delivery endpoints 18 to correspond to gripper pins 16 of a particular fixture 6. The gripper pins 16 are attachment points on the fixture 6 made of material transparent to ultraviolet radiation. A fixture 6 then is attached to the workcell stage 10 so that the gripper pins 16 of the fixture 6 align with the UV delivery endpoints 18 of the support structure 8. UV adhesive 12 is pre-applied to the surface of the gripper pins 16 at the adhesive site 14 before the work piece 4 is brought to the fixture 6.

A workcell 2 robot places a work piece 4 on the fixture 6 in the desired orientation. The control box 20 causes the UV delivery endpoints 18 to illuminate. The gripper pin 16 transmits the UV light from the UV delivery endpoints 18 through the fixture 6 to the UV adhesive 12 at the adhesive site 14 to cure the UV adhesive 12 and attach the work piece 4 to the fixture 6.

FIGS. 2A through 2D show a typical prior art production system using UV adhesive 12 to attach multiple copies of a single species of work piece 4 to a single species of fixture 6 in a single orientation. FIG. 2A shows the prior art step of setting up the workcell 2. In FIG. 2A, a support structure 8 is attached to the workcell stage 10. The UV delivery endpoints 18 are attached to the support structure 8 and to the control box 20, all within the workcell 2. The relative positions of the workcell 2, workcell stage 10, support structure 8, UV delivery endpoints 18 and control box 20 do not change during the fixturing process. Also from FIG. 2A a work piece queue 24 provides identical work pieces 2 for attachment to corresponding fixtures 4 from a fixture queue 22. Each work piece 4 will be attached to a corresponding fixture 6 from the fixture queue 22 in the same orientation.

FIGS. 2B through 2D show the prior art fixturing of a work piece 4. FIG. 2B shows that each fixture 6 is withdrawn from the fixture queue 22 and attached to the support structure 8 and to the workcell stage 10 so that the UV delivery endpoints 18 are aligned with the gripper pins 16 of the fixture 6.

FIG. 2C shows that the workcell 2 places the work piece 4 in the single orientation corresponding to the particular setup of the workcell 2 and corresponding to the identity of the support structure 8 and fixture 6. When the work piece 4 is in the single allowable orientation, the control box 20 causes the UV delivery endpoints 18 to project UV light through the gripper pins 16, thereby curing the UV adhesive 12 disposed between the gripper pins 16 and the work piece 4 and attaching the work piece 4 to the fixture 6.

From FIG. 2D, the fixture 6 and attached work piece 4 then are then removed from the workcell 2 and proceed to a downstream manufacturing process. The process repeats with the next work piece 4 and fixture 6 from their respective queues 24, 22. All of the steps of FIGS. 2A-2D can be performed either by a human operator, or in a more sophisticated process, by a robot. All of the steps of FIGS. 2A through 2D are performed in the workcell 2, preventing other use of the workcell 2 to fixture any other work pieces 4 or any other orientations of the same work piece 4.

Figure 3A:
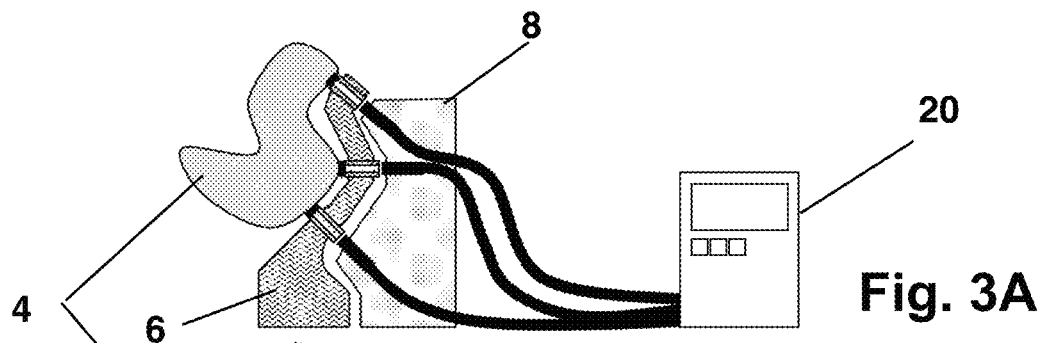
FIG. 3A is a schematic view of a prior art system used to fixture a first combination of work piece and orientation of the work piece.
Figure 3B:
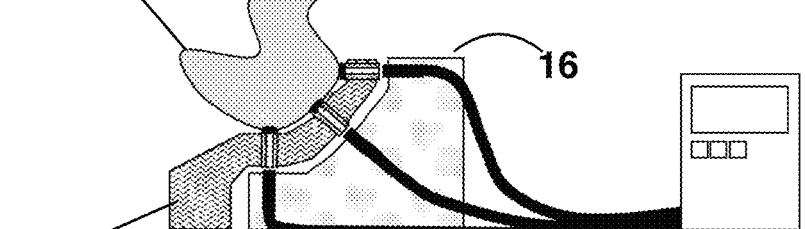
FIG. 3B is a schematic view of a prior art system used to fixture a second combination of a work piece and orientation of the work piece.
Figure 3C:
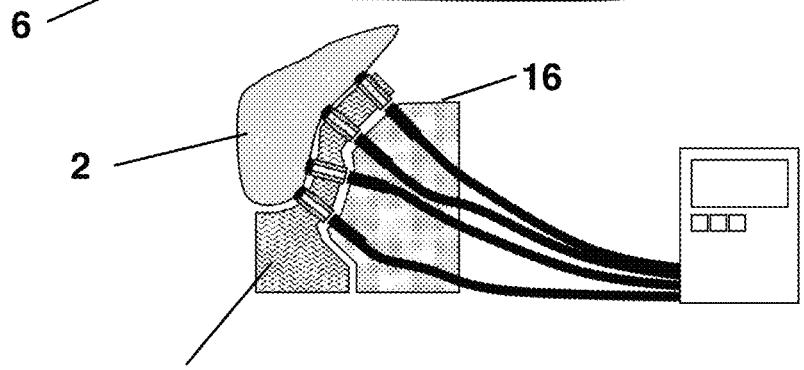
FIG. 3C is a schematic view of a prior art system used to fixture a different work piece than FIG. 3A or 3B.

In the prior art, to fixture a different work piece 4 or to fixture the same work piece 4 in a different orientation to access a different areas of the work piece 4, the work cell 2 must be set up again to accommodate the changed work piece 4 or orientation, as illustrated by FIGS. 3A through 3C. FIGS. 3A through 3C shows three different combinations of work piece 4 and fixture 6 in a prior art system. For FIGS. 3A and 3B, the work piece 4 is the same but the fixture 6 is different, to allow a machine tool access to different areas of the work piece 4. In FIG. 3C, both the work piece 4 and the fixture 6 are different. In all three cases, the arrangement and orientation of the UV delivery endpoints 18 are very different, and so the support structures 8 must also be different. A prior art workcell 2 would not be capable of the three combinations of FIGS. 3A-3C without being reconfigured for each combination.

A substantial and costly inefficiency of the prior art system is the time required to set up the workcell 2 whenever there is a change in a work piece 4 or a change in the orientation of the work piece 4. For each change, the support structure 8 is assembled within the workcell 2, each UV delivery endpoint 18 is installed at the appropriate position on the support structure 8, and each delivery endpoint is connected directly by a separate cable to its respective control box 20. For some work pieces 2 and fixtures 4, multiple control boxes 20 will be required and the UV delivery endpoints 18 of each control box 20 must be attached to the support structure 8 within the workcell 2. The support structure 8 occupies the workcell 2 during setup, preventing other use of the workcell 2 while setup is underway.

Other inefficiencies of the prior art system are that the step of attaching the fixture 6 to the support structure 8 occurs within the workcell 2 and the step of validating UV light delivery from the gripper pins 16 occurs within the workcell 2, both tying up workcell 2 time. The validation step may be required based on the demands of a particular application and comprises a UV measuring apparatus 26 measuring the intensity of the UV light output by each gripper pin 16 prior to adhering a work piece 4 to the fixture 6. Validating the UV light output of the UV delivery endpoints 18 and gripper pins 16 can detect optical obstructions beforehand, can minimize the chances of a failed adhesive bond, and hence can minimize the chance of destroying or damaging a work piece 4 or machine tool due to an improperly adhered work piece 4. The prior art validation step must be performed inside the workcell 2 after the fixture 6 and support structure 8 have been placed in the workcell 2, which is shown by FIG. 2B.

Both the prior art set up step and the prior art validation step occur with the support structure 8 and fixture in place on the workcell stage 10 within the workcell 2, tying up valuable workcell 2 time and preventing the workcell 2 from being used for other tasks, such as fixturing work pieces 2. A robotic, automated workcell 2 that can precisely place work pieces 4 relative to fixtures 6 is very expensive. Additionally, the control box 20 is also very expensive and, due to a limited number of endpoints per control box 20, often several control boxes 10 are needed to cure all of the adhesive sites 8 on a single fixture 6 simultaneously. Because of the high costs, the time of the workcell 2 and control box 20 combination is very valuable.

FIGS. 4 through 14 illustrate the adhesive fixturing apparatus, system and method of the Invention. From FIGS. 4 and 5, a UV delivery assembly 28 includes a support structure 8 and UV delivery endpoints 18 supported by the support structure 8. The UV delivery endpoints 18 are also referred to herein as UV light sources 30. The UV light sources 30 are controlled by a support structure controller 32, also referred to herein as a controller 32, which is supported by the support structure 8 and operably connected to a bus connector 34. Two or more of the UV light sources 30 may be attached to a single bus connector 34. Alternatively, the UV light sources 30 may be attached to two or more bus connectors 34.

Connection of the UV light sources 30 to the workcell bus 36 through the bus connector 34 achieves the principal advantage of the Invention over the prior art; namely, it allows the UV delivery system 28 to be attached to the fixture 6 at a location 44 that is separate from the workcell 2 and at a time that is different from that of the fixturing operation within the workcell 2. The steps of assembling the fixture 6, UV light sources 30 and support structure 8 and the validation step do not tie up the workcell 2, resulting in more efficient use of the workcell 2 and a lower cost for each fixtured work piece 4.

When the assembled combination of the support structure 8 and the fixture 6 is moved to the workcell 2 after assembly, the bus connector 34 is attached to a hot-swappable power and data connection, referred to herein as the 'workcell bus 36'. The control box 20 is operably attached to the workcell bus 36. When the bus connector 34 is attached to the workcell bus 36 within the workcell 2, the control box 20 controls the complex functions of the UV delivery system 28, such as activating the UV light sources 30 in multiple timed stages or sequences, and managing the temperature, intensity, and operational life of the UV light sources 30.

Figure 4:
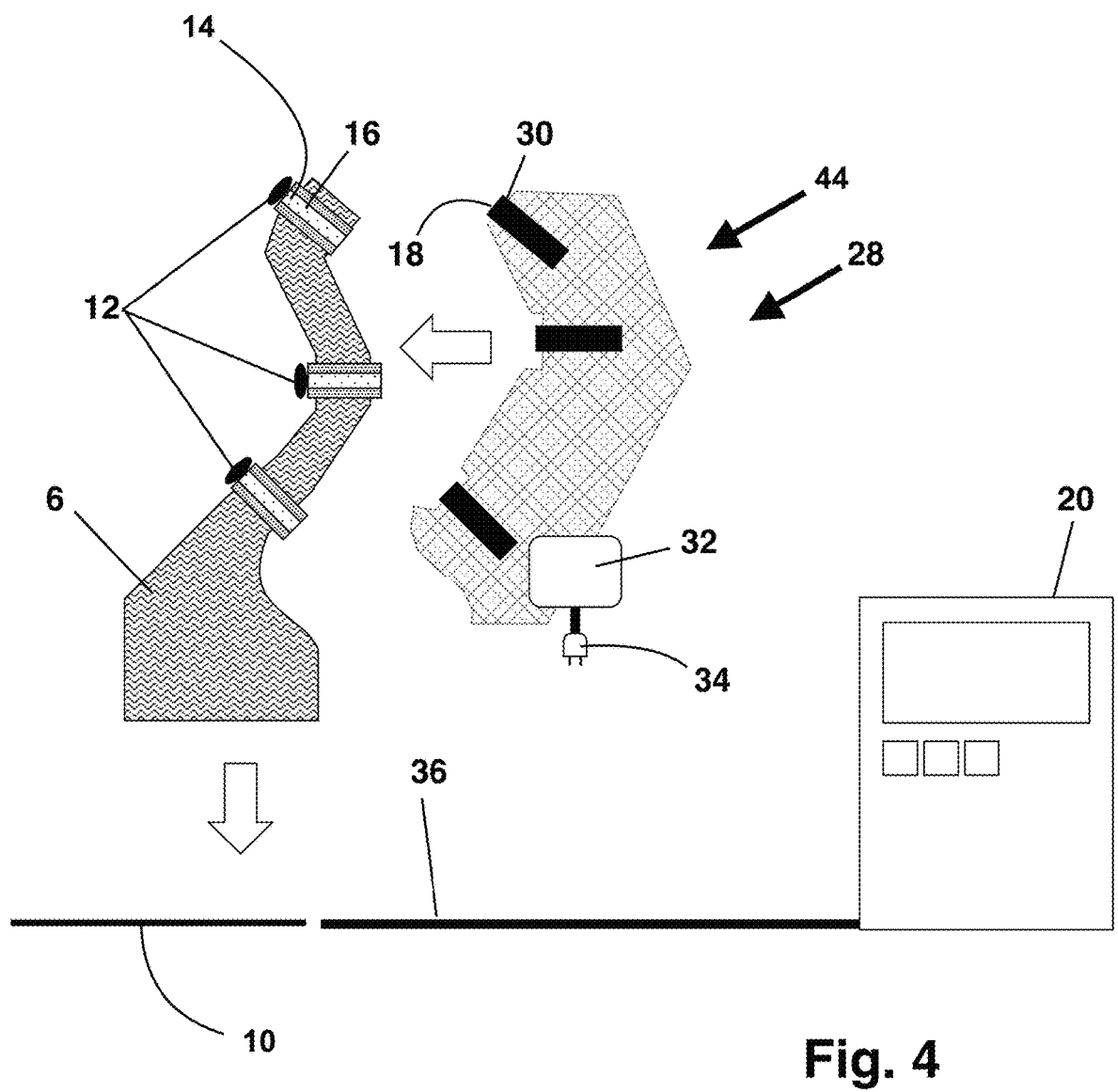
FIG. 4 is a schematic view of the adhesive fixturing system of the Invention.
Figure 5:
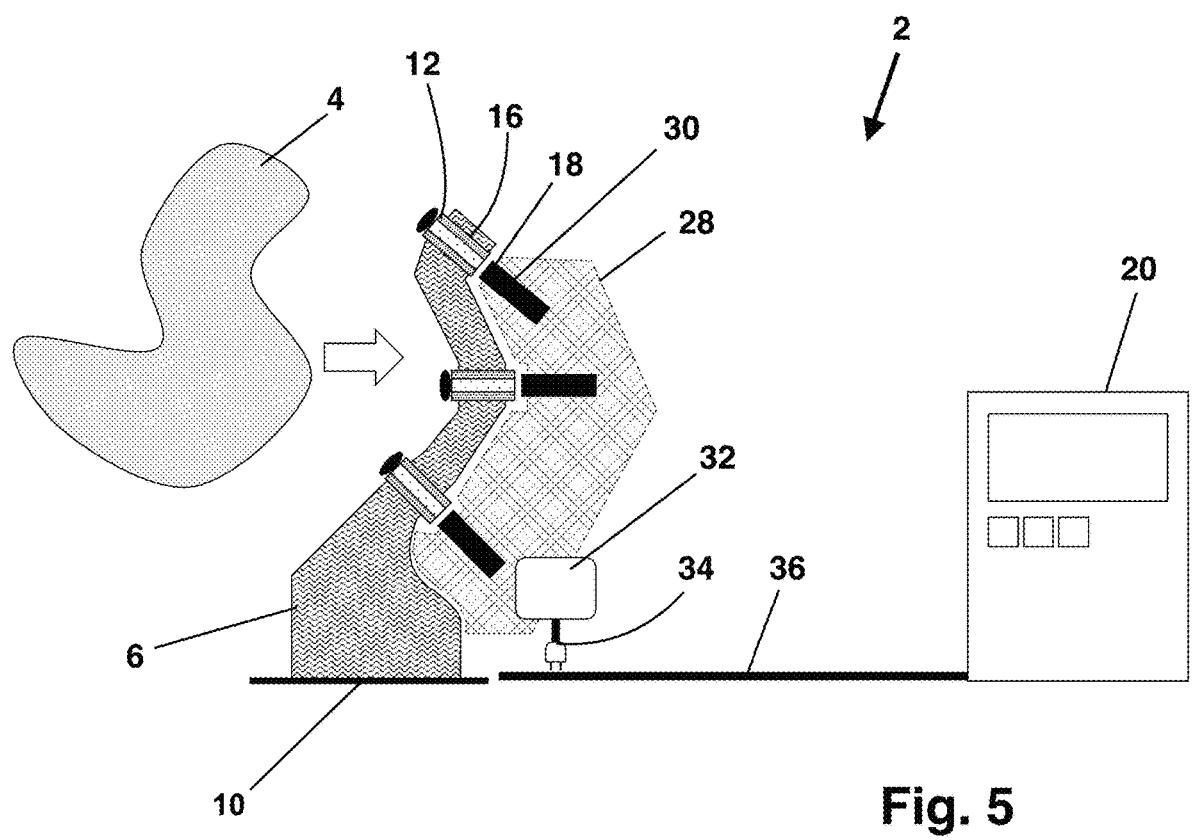
FIG. 5 is a schematic view of the adhesive fixturing system of the invention in operation.

Also from FIGS. 4 and 5, the UV light sources 30 may be ultraviolet LEDs integrated into a support structure 8. A support structure controller 32 that includes a low cost microcontroller 38 and LED driver circuits is embedded in the support structure 8, as is the power/data bus connector 34. Inexpensive temperature transducers, onboard non-volatile memory, and integrated circuits that provide unique serial numbers to each fixtured work piece may be added to the support structure controller 32 as well. The 'UV delivery system 28' includes the support structure 32, the UV light sources 30, the bus connector 34, and any other components required to selectably emit UV light from the UV light sources 30 in alignment with the gripper pins 16 under the control of the control box 20 when the bus connector 34 is in engagement with the workcell bus 36.

The prior art cables that connected the UV delivery endpoints 18 with the control box 20 are replaced in the Invention by the single workcell bus 36 that carries both power and data communication with the support structure controller 32 through the bus connector 34. An example of a sufficient data connection would include the Controller Area Network (CAN) bus system used in modern automotive applications, as the physical hardware necessary is simple and inexpensive and microcontrollers 38 which support the CAN protocol natively are common and similarly inexpensive.

The electrical connection between the bus connector 34 and the workcell bus 36 may be contact-based, as in metallic conductive pins engaging metallic conductive receptacles. The electrical communication between the bus connector 34 and workcell bus 36 may occur automatically when the support structure 8 and fixture 6 combination is placed on the workcell stage 10. Any other configuration of conductor-to-conductor contact to electrically connect the bus connector 34 to the workcell bus 36 is contemplated by the Invention. The communications connection between the control box 20 and the support structure controller 32 also may be wireless using any suitable form of wireless communication. The support structure 8 may include an onboard battery, not shown, to power the UV light sources 30 under the command of the control box 20.

In use and as shown by FIG. 4, the UV delivery assembly 28 is first attached to the fixture 6 at a location 44 outside the workcell 2. Next the fixture 6 with the attached UV delivery assembly 28 is placed into the workcell 2 and the support system controller 32 automatically connects to the workcell bus 36 through the bus connector 34, preferably through metallic contacts. The small onboard microcontroller 38 powers on and responds to instructions from the control box 20.

In use and as shown by FIG. 5, the workcell 2 places the work piece 4 in contact with the fixture 6 in the desired orientation. The control box 20 triggers the UV light sources 30 through the workcell bus 36 and the bus connector 34. The support structure controller 32 receives the command and illuminates the UV light sources 30, curing the UV adhesive 12 and attaching the work piece 4 to the fixture 6.

FIGS. 6A through 6E is collectively a schematic illustrated flow chart to demonstrate the operation of a workcell 2 using the Invention. From FIG. 6A, a work piece queue 24 provides work pieces 2 to be adhesively attached to fixtures 4. The work piece queue 24 contains work pieces 4 from several different families and orientations, each of which requires a different fixture 6. Several fixture queues 22 contain different types of fixtures 4. A reserve 42 contains at least one of each UV delivery assembly 28 corresponding to each fixture 6.

Figures 6A, 6B, 6C, 6D, 6E:
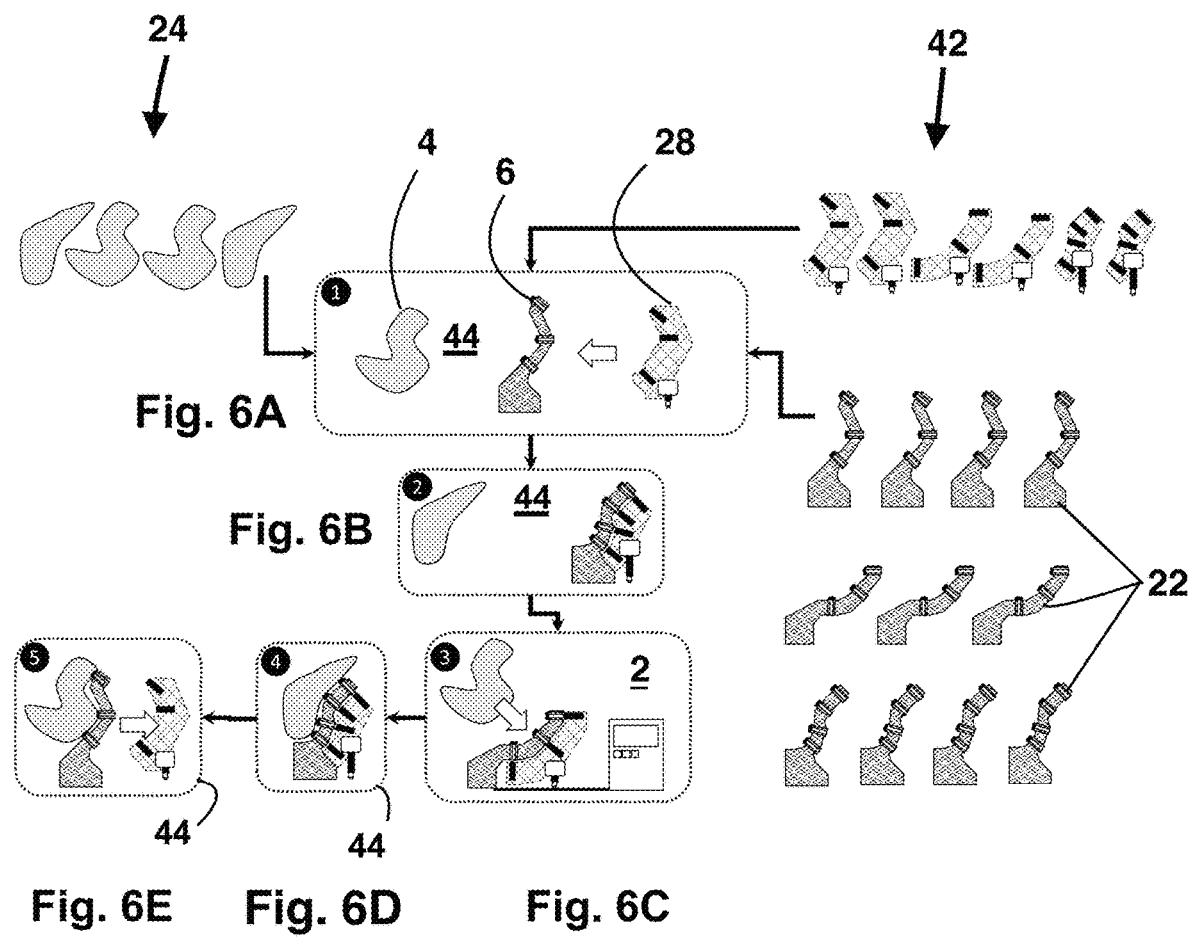
FIG. 6A-6D is a schematic illustrated flow chart of the adhesive fixturing system of the invention illustrating parallel operations on different support structures, fixtures and work pieces in a production environment.
FIG. 6E shows separation of the UV delivery assembly from the fixtured work piece.

In the first stage of the process shown by FIG. 6A and at a location 44 removed from the workcell 2, a work piece 4 is taken from the work piece queue 24. A robot retrieves the appropriate fixture 6 and UV delivery assembly 28 from the fixture queue 22 and the reserve 42. Alternatively, a robot may retrieve fixtures 6 and UV delivery assemblies 28 from their respective queues 22, 42 and the task of retrieving the work piece 4 may be deferred until the third stage, below.

Figure 13:
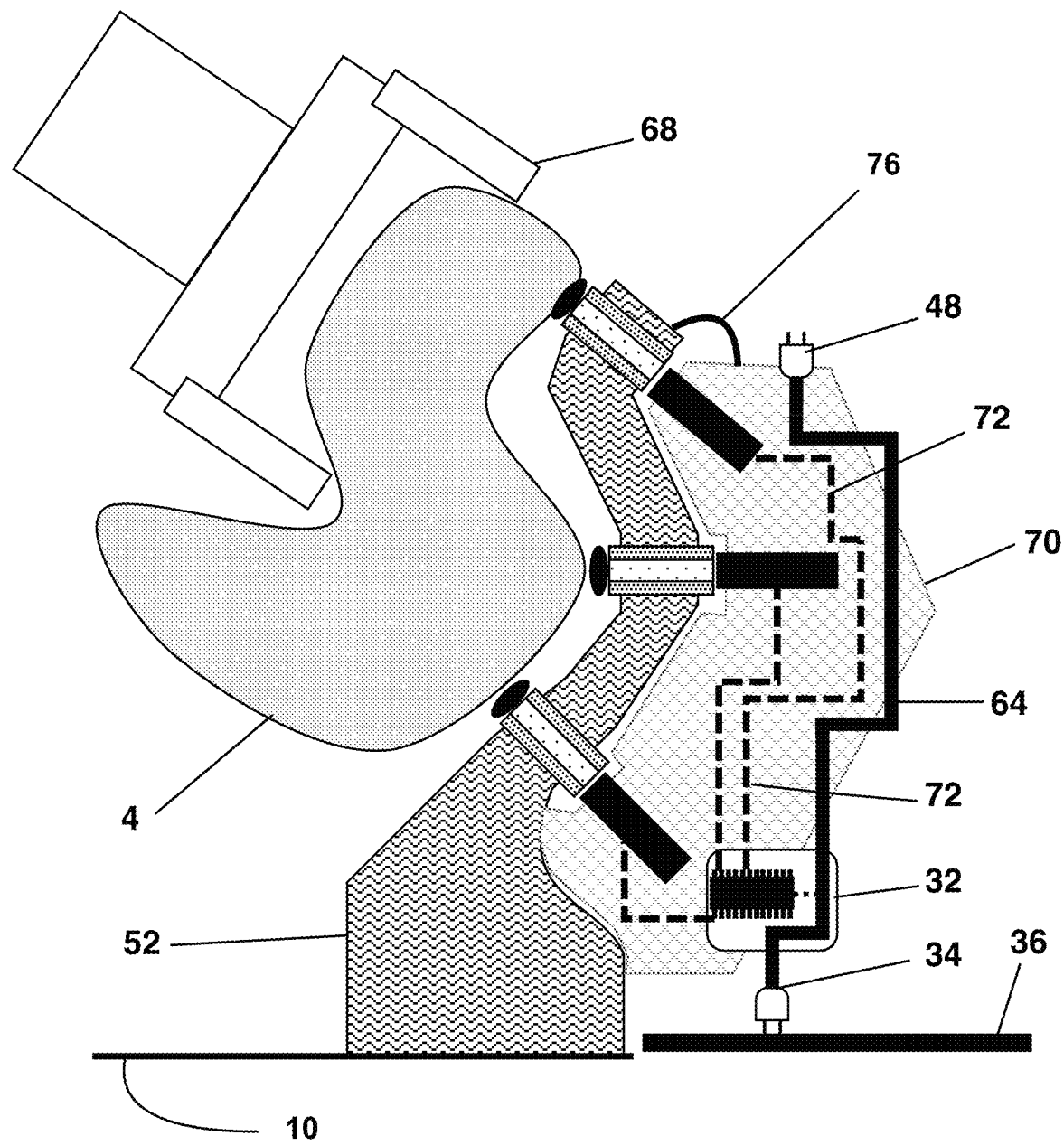
FIG. 13 illustrates use of a first UV delivery assembly for the compound fixture of FIG. 11.

In the second stage shown by FIG. 6B at a location 44 outside of the workcell 2, the ultraviolet delivery assembly 28 is attached to the fixture 6 by any suitable mechanism, such as a latch, pin detents, or a magnetic or pneumatic clamp 76, as shown by FIG. 13.

In the third stage shown by FIG. 6C, the fixture 6 is placed onto the workcell stage 10 in the workcell 2 and the support structure controller 32 connects to the workcell bus 36 through the bus connector 34 and hence to the control box 20. The work piece 4 is positioned by the workcell 2. The control box 20 commands the support structure controller 32 to illuminate the UV light sources 30, which cure the UV adhesive 12, attaching the work piece to the fixture. The complex functions of the UV delivery assembly 28 are managed by the control box 20 through the data channel of the workcell bus 36.

In the fourth stage, shown by FIG. 6D, the work piece 4, now rigidly attached to the fixture 6, is removed from the workcell 2 along with the attached UV delivery assembly 28 as a single unit.

In the fifth and final stage shown by FIG. 6E, the UV delivery assembly 28 is detached from the attached fixture 6 and work piece 4. The work piece 4 and fixture 6 proceed to downstream manufacturing processes, and the UV delivery assembly 28 is returned to the reserve 42.

Note that the above stages may occur in parallel in the form of an operations pipeline, where each stage (FIGS. 6A-6E) in the pipeline can be occupied by a different combination of work piece 4 and fixture 6. For example, in stages one and two, a first UV delivery system 28 and a first support structure 8 may be selected to accommodate a first work piece 4 and may be removably attached together. The resulting assembly may be stored for later use. Simultaneously, the workcell 2 may be implementing stage 3 by fixturing a second work piece 4 using a second UV delivery assembly 28 and fixture 6 combination. The net result is more efficient use of the workcell 2, higher throughput of the work cell 2 and lower costs for each work piece 4.

FIGS. 7A-7E is an illustrated schematic flow chart showing validation operations outside the workcell 2. FIG. 7A is FIG. 6A and shows the selected support structure 8, fixture 6 and work piece 4 for the respective queues 42, 22, 24. FIG. 7B illustrates the validation step performed on the assembled fixture 6 and UV delivery assembly 28 at a location 44 separate from the workcell 2. To validate the intensity of the UV radiation at the adhesive sites 8, a separate validation bus 46 may be provided outside of the workcell 2. The same control box 20 that controls the workcell bus 36 can control the validation bus 46 or a second control box 20 placed outside of the workcell 2 may control the validation bus 46. The support structure controller 32 connects through bus connector 34 to the validation bus 46. The control box 20 illuminates the UV light sources 30 and the UV light output of the gripper pins 16 is measured by a UV measuring apparatus 26. If the UV light output meets the requirements for the work piece 4 and fixture 6, the fixture 6 and UV delivery assembly 28 combination passes the validation test. The UV light output validation process occurs outside of the workcell 2 and does not use valuable workcell 2 time. The result is lower cost for validation, more efficient use of the workcell 2 and lower cost for each work piece 4.

After the validation step, from FIG. 7C the assembled fixture 6 and UV delivery assembly 28 are attached to the workcell stage 10 within the workcell 2 and the work piece 4 is placed by the workcell 2 in a desired orientation with respect to the fixture 6. The control box 20 illuminates the UV light sources 30, attaching the work piece 4 to the fixture 6. From FIG. 7D, the attached work piece 4, fixture 6 and UV delivery system 28 are removed from the workcell 2.

From FIG. 7E, the UV delivery assembly 28 is separated from the fixture 6 and returned to the reserve 42. The fixture 6 and work piece 4 are ready for further machining operations.

Figure 8:
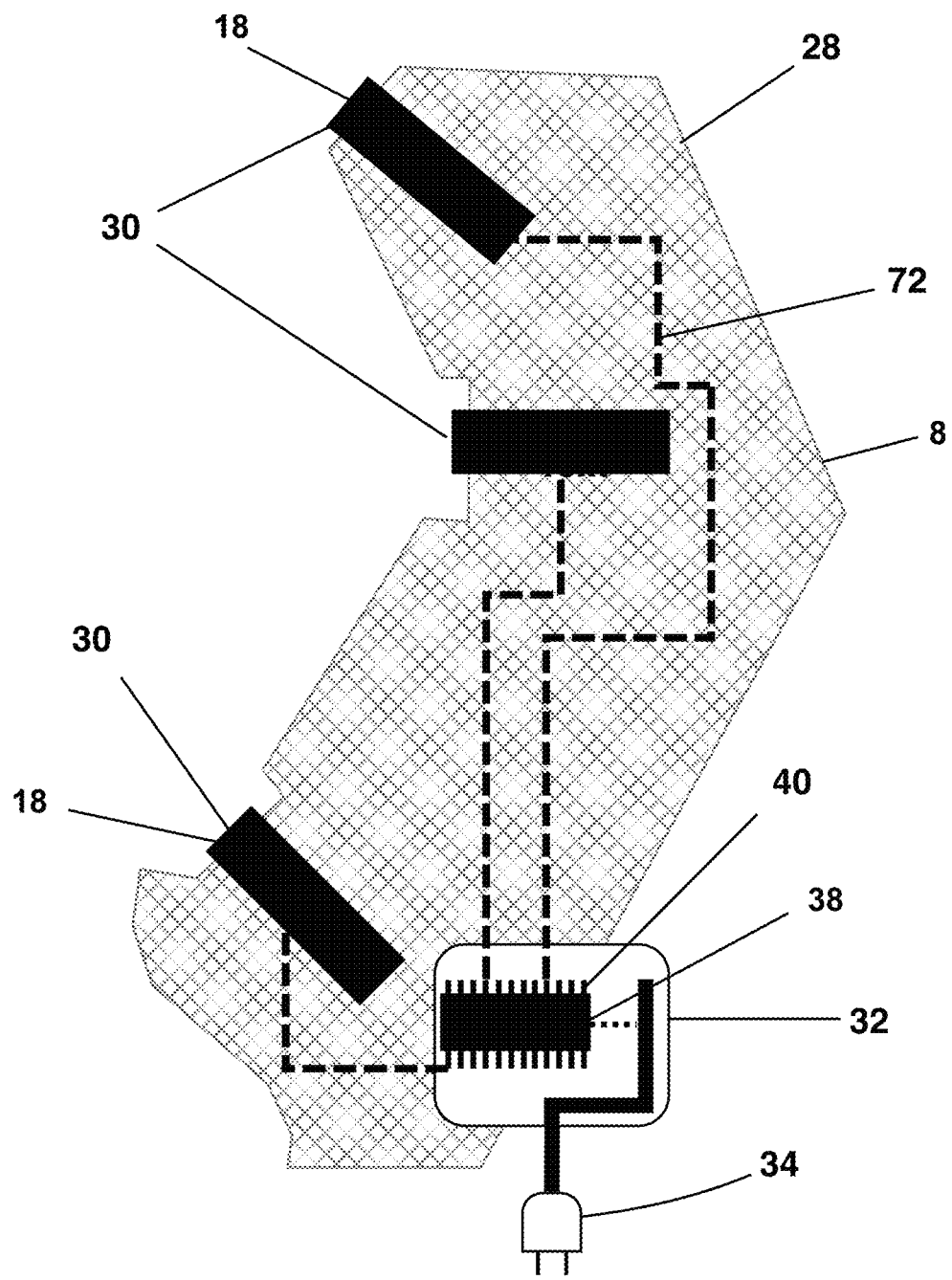
FIG. 8 is a schematic diagram of a UV delivery assembly comprising a support structure, UV light sources, support structure controller, bus connector, and associated electrical and data connections.

FIG. 8 shows a UV delivery assembly 28 comprising the support structure 8, the support structure controller 32 attached to the support structure 8, and the bus connector 34 available to connect the support structure controller 32 to the workcell bus 36 and hence to the control box 20. FIG. 8 also shows the wired connection 72 between the UV delivery endpoints 18, which may be UV light sources 30, and the support structure controller 32.

Figure 9:
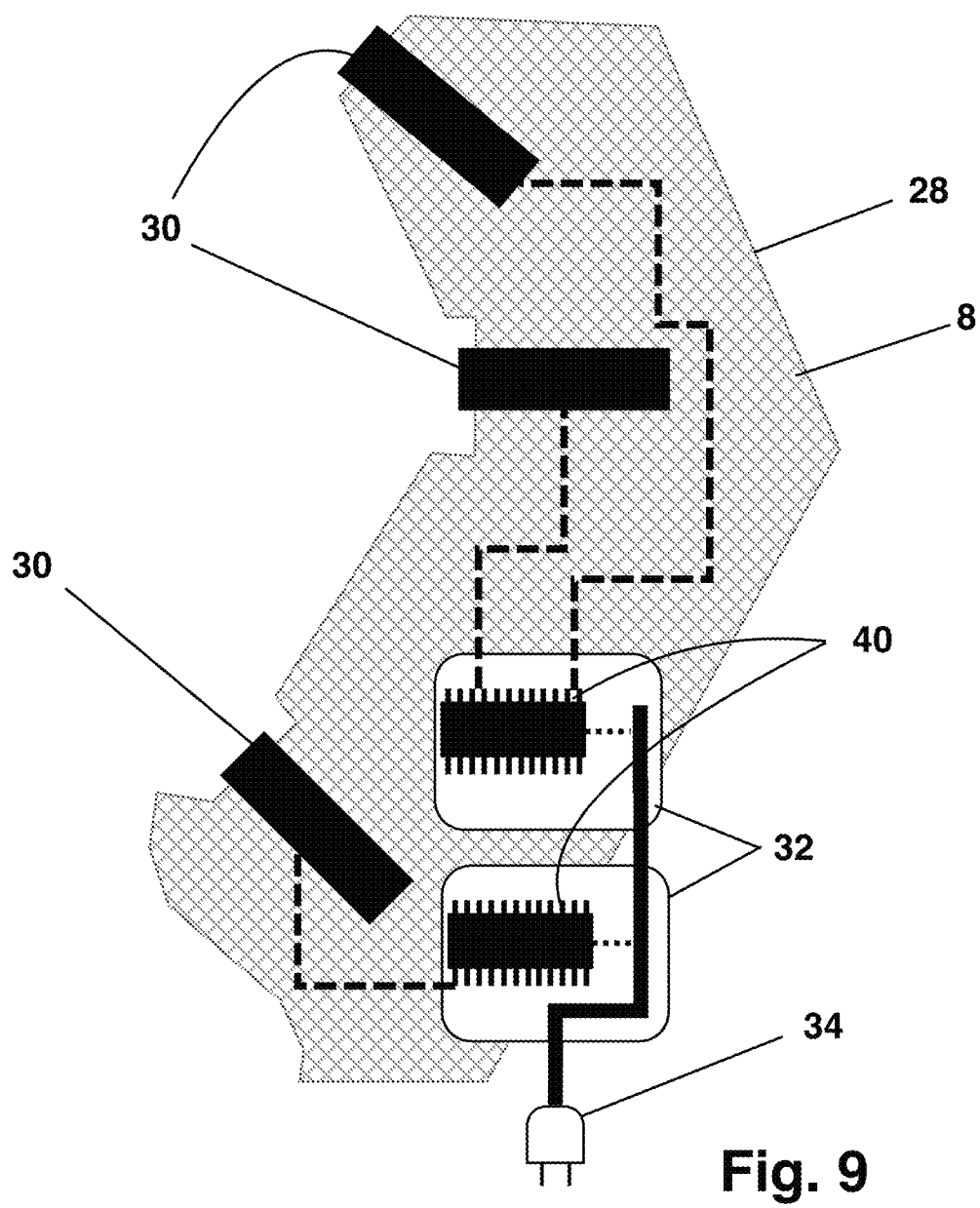
FIG. 9 is a schematic diagram of a support structure with a support structure controller having two microprocessors.

FIG. 9 is similar to FIG. 8 except that two or more microprocessors 40 may be included in the support structure controller 32. Because of the bus nature of the bus connector 34 and the workcell bus 36, multiple microprocessors 40 can be controlled by attaching each microprocessor 40 to the bus connector 34 and hence to the workcell bus 36.

Figure 10:
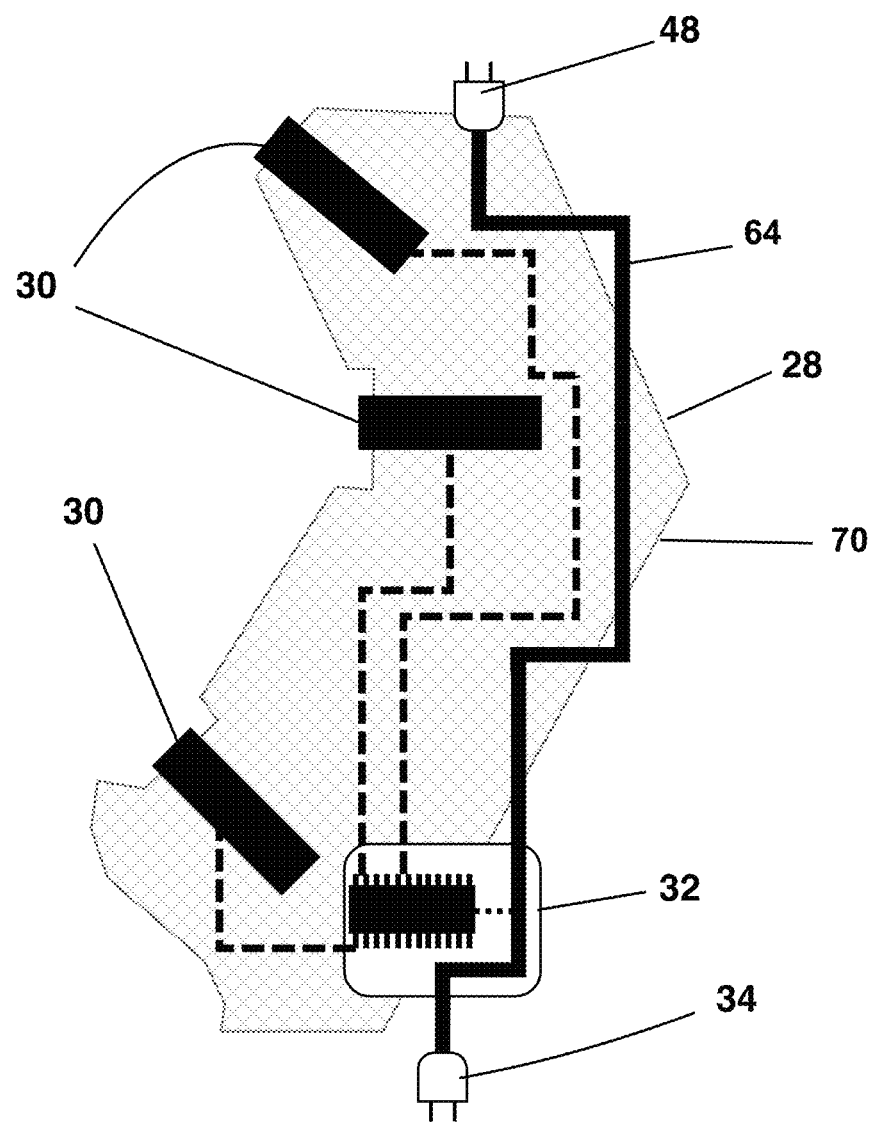
FIG. 10 is a schematic diagram of a UV delivery assembly support structure with an additional bus connector location and a support structure bus.

FIG. 10 shows the UV delivery assembly 28 of FIG. 8 except that the bus connector 34 is extended through the support structure 8 and provides an additional bus connector location 48. The additional bus connector location 48 has particular application for compound fixtures 44 and compound support structures, as discussed with respect to FIG. 14, below. The additional bus connector location 48 also provides another connection pathway to the workcell bus 36 or to a validation bus 46 or another test bus.

Figure 11:
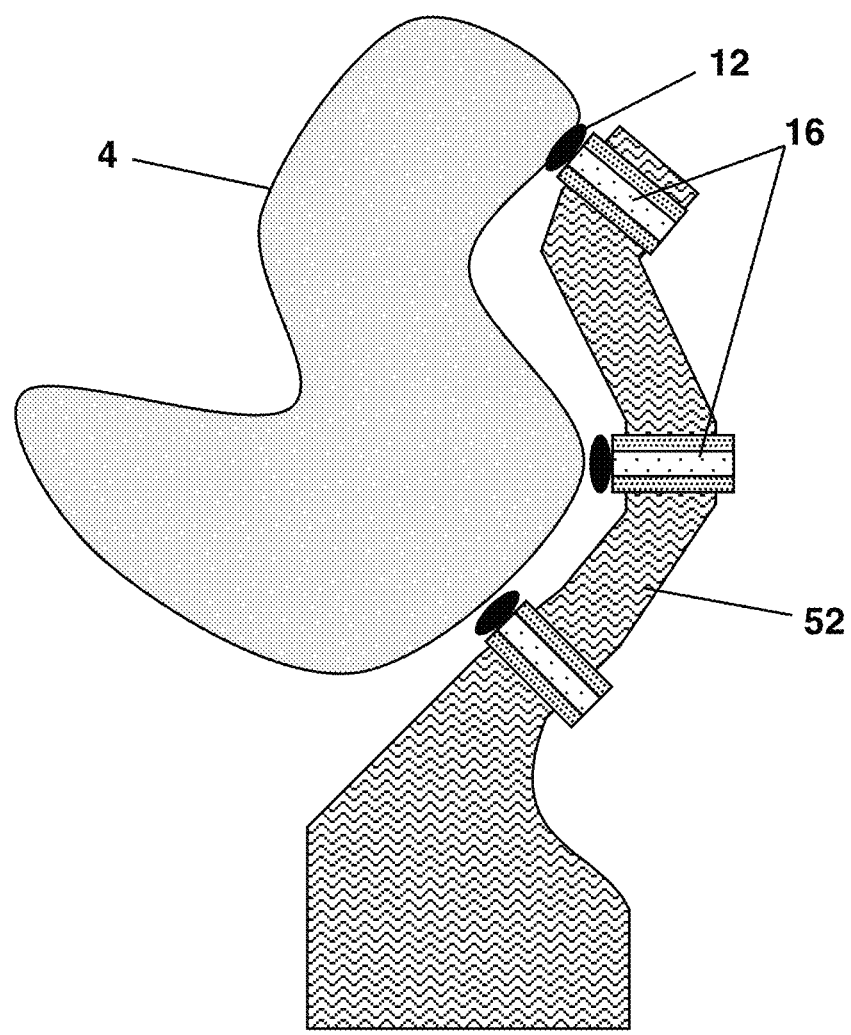
FIG. 11 is a schematic diagram of a compound fixture and work piece with only the first fixture of the compound fixture attached to the work piece.
Figure 12:
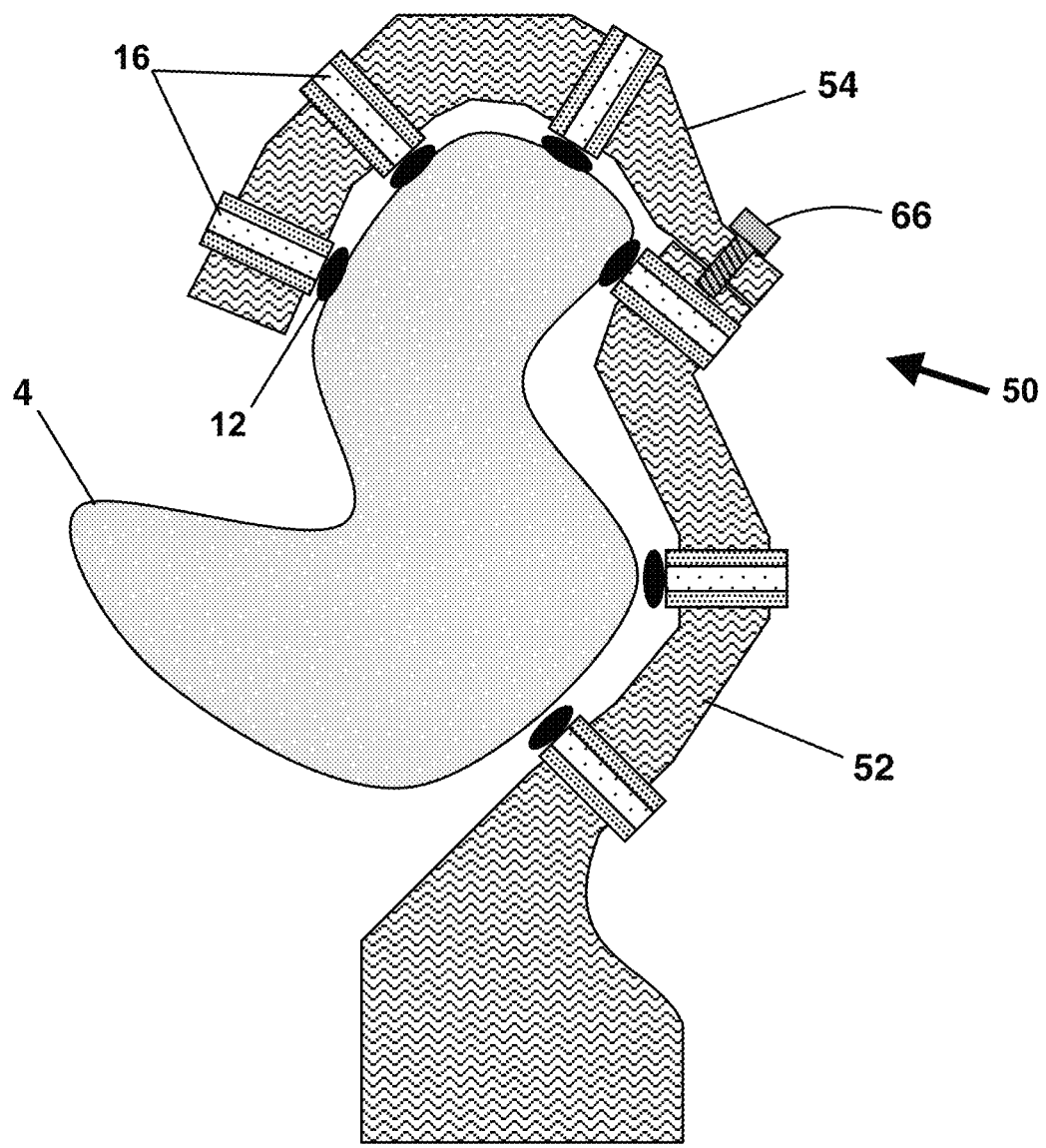
FIG. 12 is the schematic diagram of FIG. 11 with the second fixture attached to the first fixture to define the compound fixture.

FIGS. 11 through 14 illustrate a process for attaching a work piece 4 to a compound fixture 50 using the system of the Invention. FIG. 11 illustrates a work piece 4 attached to a first fixture 52 that is half of a compound fixture 50. FIG. 12 illustrates the same work piece 4 attached to a first fixture 52 and a second fixture 54, which together define the compound fixture 50. The first and second fixtures 46, 48 are connected together by a strong connection, such as a threaded fastener 66. FIG. 12 shows the work piece 4 and compound fixture 50 combination ready for machining.

Figure 14:
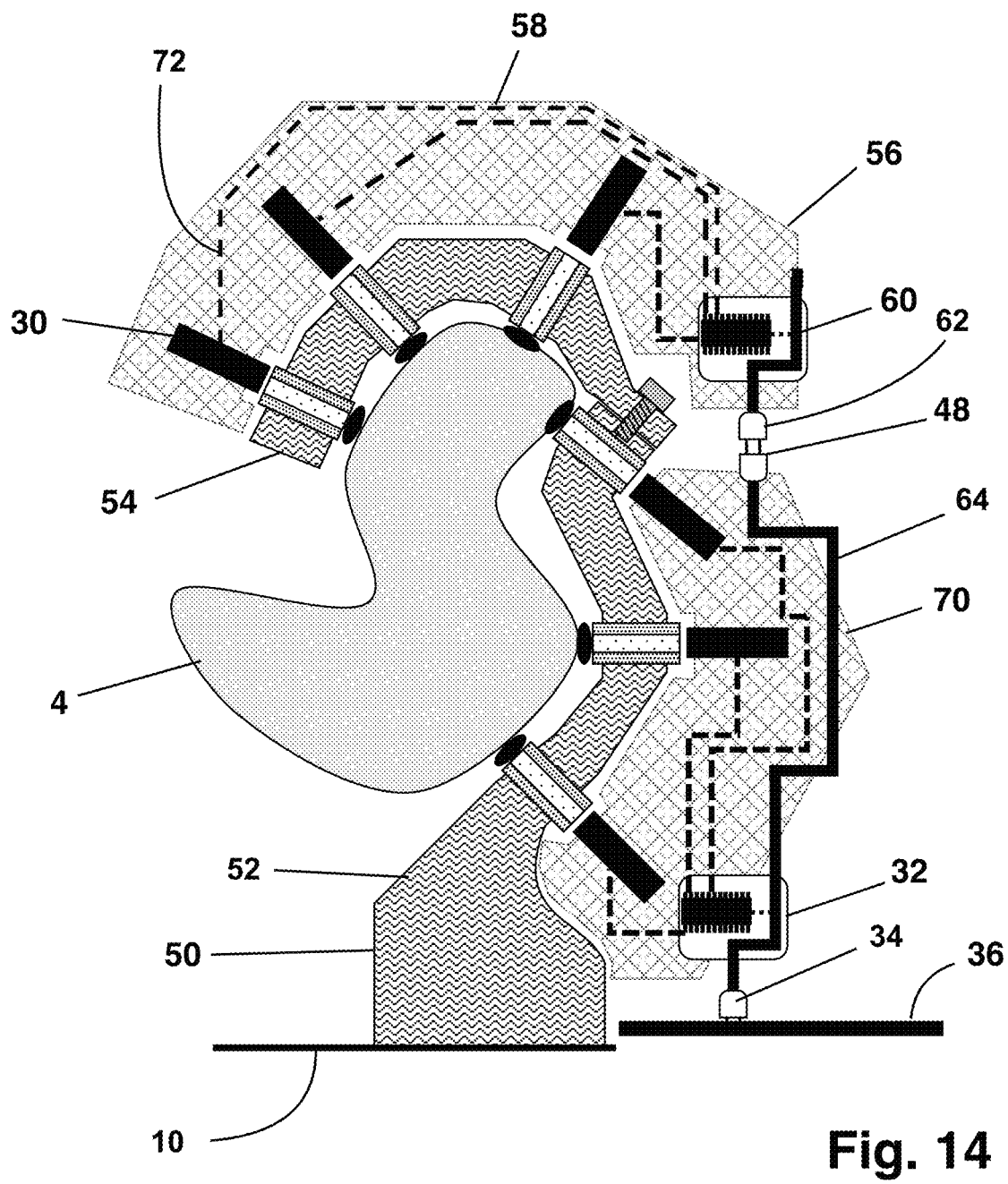
FIG. 14 illustrates use of a second UV delivery assembly for the compound fixture of FIG. 12.

FIGS. 13 and 14 illustrate the use of the apparatus, system and method of the Invention to attach the work piece 4 to a compound fixture 50. FIG. 13 shows that a combination of a first fixture 52 and a first UV delivery assembly 70 (which were joined outside of the workcell 2) have been placed on the workcell stage 10 in the workcell 2 and the bus connector 34 connected to the workcell bus 36. The first UV delivery assembly 70 comprises a support structure 8, a first support structure bus 64, a support structure controller 32, and UV light sources 30.

A precision robot 68 picks up the work piece 4 and holds the work piece 4 in a desired orientation with respect to the first fixture 52. The control box 20 commands the support structure controller 32 to illuminate the UV light sources 30 of the first UV delivery assembly 70. The support structure controller 32 receives the command and illuminates the UV light sources 30. The UV light passes through the gripper pins 16 to the UV adhesive 12, attaching the work piece 4 to the first fixture 52.

In the instance of FIG. 14, the first fixture 52 is not adequate to hold the work piece 4. FIG. 14 shows that a second fixture 54 is bolted to the first fixture 52 in the workcell 2 to define a compound fixture 50. The second fixture 54 has gripper pins 16, as described above, to transmit UV light to UV adhesive 12 between the work piece 4 and the second fixture 54. A second UV delivery assembly 56 has UV light sources 30 that align with the gripper pins 16 of the second fixture 54. The second UV delivery assembly 56 also features a second support structure 58 and a second support structure controller 60. The second support structure controller 60 connects through a second support structure bus connector 62 to the first support structure bus 64 and hence to the control box 20 through the bus connector 34. The control box 20 therefore controls all of UV light sources 30 of both the first UV delivery assembly 70 and the second UV delivery assembly 56 when the bus connector 34 is attached to the workcell bus 36.

From FIG. 14, the control box 20 commands the second support structure controller 60 to illuminate its UV light sources 30, which cure the UV adhesive 12 between the second fixture 54 and the work piece 4. The work piece 4 is now secured to the compound fixture 50. The work piece 4 with the compound fixture 50 attached and with the first and second UV delivery assemblies 28, 56 attached is removed from the workcell 2. The first and second UV delivery assemblies 28, 56 are removed from the first and second fixtures 52, 54. The additional bus connector location 48 is detached and the bus connector 34 is removed from the workcell bus 36. The combination of the work piece 4 and compound fixture 50 is now ready for machine operations.

The compound fixture 50 may comprise two, three or more portions as needed for a particular application. A compound UV delivery assembly 28 similarly may comprise two, three or more UV delivery assemblies 28, each configured to connect to the workcell bus 36 in the manner described above and to act under the control of the control box 20.

As noted above, the UV delivery assembly 28 may include temperature sensors 74 corresponding to the UV light sources 30 to inform the support structure controller 32 or the control box 20 of the temperature of the UV light sources 30 so that the support structure controller 32 or the control box 20 can consider the temperature of the UV light sources 30 in illuminating those UV light sources 30.

Figure 15:
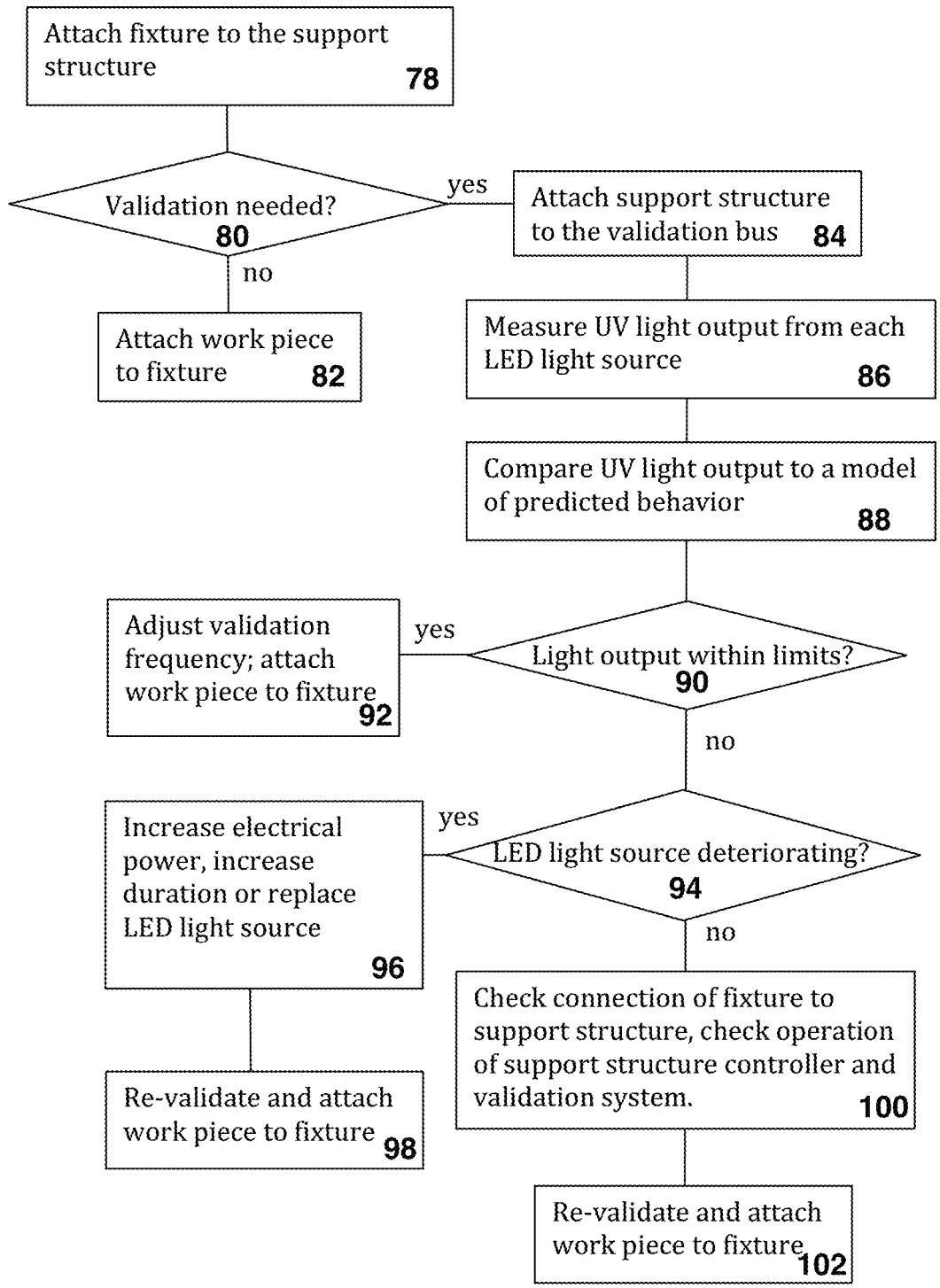
FIG. 15 illustrates validation outside of the workcell.

One method of validating the fixture 6 and support structure 8 combination is shown by FIG. 15. From step 78, the fixture 6 is attached to the support structure 8 outside of the workcell 2, thus not occupying the workcell 2 and freeing the workcell 2 for the high-value task of fixturing work pieces 4. Step 80 is determining whether validation is needed. For high-value work pieces 4, each fixture 6 and support structure 8 combination may be validated each time the fixture 6 and support structure 8 are joined. For lower-value work pieces 4, the cost and time required for the validation step may outweigh gains in reliability, particularly when the support structure 8 and UV light sources 30 have low usage and are in good condition. The step of determining whether validation is required may involve attaching the fixture 6 and support structure 8 combination to the validation bus 46. The validation system may read a database of prior validation events stored by the support structure controller 32. The validation system may decide based on the database that validation is not required each time a fixture 6 is attached to the support structure 8 and may determine a frequency of validations consistent with the condition and projected life of the UV light sources 30. If the UV light sources 30 and associated support structure 8 do not require validation, from step 82 the support structure 8 and fixture 6 are ready to proceed to the workcell 2 for fixturing of a work piece 4.

If validation is required and if the support structure 8 is not already attached to the validation bus 46, the support structure 8 is attached to the bus in step 84. The validation system measures the UV light output from each gripper pin 16 in step 86. The validation system compares the UV light output from the gripper pins 16 to a model of the predicted behavior of the UV light sources 30 and gripper pins 16, from step 88. The validation system may measure any other parameters that assist the validation system in evaluating the UV light sources, such as the temperature of LED lamps.

If the UV light output is within limits from step 90 indicating a healthy UV light source 30 and a good optical connection to the gripper pin 16, the fixture 6 and support structure 8 are ready for attachment of a work piece 4 in the workcell 2, which is step 92. The validation system may adjust the validation frequency for the support structure 8 and UV light sources 30 based on the measured UV light output, also from step 92.

If the UV light output is not within limits, from step 94 the validation system may determine whether the issue is caused by deterioration of an LED lamp by comparing the measured UV light output to the modeled deterioration expected due to age and use. If the measured UV light output is consistent with deterioration of the LED lamps, the validation system may attempt to extend the life of the LED lamps by increasing the electrical power to the LED lamps or by extending the duration of LED lamp illumination, all from step 98. If the effort is not successful, the validation system may reject the support structure 8 and specify replacement of the LED lamp.

If the validation system in step 94 determines that the LED lamp is not deteriorating, from step 100 the validation system may check the operation of the support structure controller 32 and of the validation system itself. The validation system may inform a human operator of errors that it detects and may recommend that the fixture 6 be re-aligned with the support structure 8. When the fixture 6 and support structure 8 pass re-validation in step 102, the fixture 6 and support structure 8 are ready for attachment of a work piece 4 to the fixture 6 in the workcell 2.

The validation system may be controlled by a microprocessor 40 and may be the control box 20. The control box 20 may be operably attached to the validation bus 46.

The following is a list of numbered elements from the specification and drawings:
Workcell 2
Work Piece 4
Fixture 6
Support structure 8
Workcell stage 10
UV Adhesive 12
Adhesive site 14
Gripper Pin 16
UV Delivery Endpoint 18
Control Box 20
Fixture queue 22
Work piece queue 24
UV measuring apparatus 26
UV delivery assembly 28
UV light source 30
Support structure controller 32
Bus connector 34
Workcell bus 36
Microcontroller 38
Microprocessor 40
Reserve 42
a location 44
Validation bus 46
Additional bus connection location 48
Compound fixture 50
First fixture 52
Second fixture 54
Second UV delivery assembly 56
Second support structure 58
Second support structure controller 60
Second support structure bus connector 62
First support structure bus 64
Threaded fastener 66
Precision robot 68
First UV delivery assembly 70
Wired connection 72
Temperature sensors 74
A latch, a pin, a detent, a magnetic clamp or a pneumatic clamp 76

What is claimed is:

1. An apparatus for adhesive fixturing of a work piece to a fixture, the apparatus comprising:
   a. an automated workcell configured to receive and retain the fixture and the work piece;
   b. a robot operably attached to the workcell and configured to place the work piece and the fixture in contact in a desired orientation, the fixture including a gripper pin configured to transmit UV light to a UV adhesive disposed between the fixture and the work piece when the fixture and work piece are in contact in the desired orientation;
   c. a UV light source, the UV light source having a configuration for selectable illumination of the UV adhesive through the gripper pin, the UV light source being operably connected to a bus connector;
   e. a workcell bus attached to the workcell, the bus connector being operably connectable to the workcell bus;
   f. a control box operably connected to the workcell bus, the emission of UV light from the UV light source through the gripper pin being controllable by the control box when the bus connector is operably connected to the workcell bus, wherein the gripper pin is a one of a plurality of gripper pins and wherein the UV light source is a one of a plurality of UV light sources, each of the plurality of UV light sources corresponding to a one of the gripper pins, each of the UV light sources being aligned with the corresponding gripper pin when the fixture and work piece are placed in contact in the desired orientation, each of the UV light sources being selectably connectable to the control box through the bus connector and workcell bus for control of the emission of UV light from the plurality of UV light sources so that at least two of the UV light sources are separately controllable by the control box.

2. The apparatus of claim 1 the apparatus further comprising:
   a support structure, each of the UV light sources being attached to and supported by the support structure, the support structure being selectably attachable directly to the fixture so that the fixture and support structure are in a fixed engagement, the support structure holding each of the UV light sources in alignment with the corresponding gripper pin when the support structure and the fixture are attached, the support structure being selectably detachable from the fixture.

3. The apparatus of claim 2 wherein the support structure is selectably attachable directly to the fixture so that the fixture and support structure are in a fixed engagement when the fixture is not retained by the workcell.

4. The apparatus of claim 2, the apparatus further comprising:
   a battery, the battery being attached to and supported by the support structure, the battery being configured to provide a power to illuminate the UV light sources, wherein the bus connector is configured to communicate wirelessly with the control box.

5. The apparatus of claim 2, the apparatus further comprising: a latch, a pin, a detent, a magnetic clamp or a pneumatic clamp configured to attach the support structure to the fixture.

6. An apparatus for adhesive fixturing of a work piece to a fixture, the apparatus comprising:
   a. an automated workcell configured to receive and retain the fixture and the work piece;
   b. a robot operably attached to the workcell and configured to place the work piece and the fixture in contact in a desired orientation, the fixture including a gripper pin configured to transmit UV light to a UV adhesive disposed between the fixture and the work piece when the fixture and work piece are in contact in the desired orientation;
   c. a UV light source, the UV light source having a configuration for selectable illumination of the UV adhesive through the gripper pin, the UV light source being operably connected to a bus connector;
   e. a workcell bus attached to the workcell, the bus connector being operably connectable to the workcell bus;
   f. a control box operably connected to the workcell bus, the emission of UV light from the UV light source through the gripper pin being controllable by the control box when the bus connector is operably connected to the workcell bus;
   g. a controller, the controller being operably attached to the bus connector, the controller being operably attached to the UV light sources, the controller being operably attached to the workcell bus when the bus connector is attached to the workcell bus, the controller not being operably attached to the workcell bus when the bus connector is not attached to the workcell bus, the controller being configured to selectably illuminate the UV light sources upon command by the control box when the bus connector is attached to the workcell bus.

7. The apparatus of claim 6, further comprising: a support structure, the UV light source being attached to and supported by the support structure, the support structure being selectably attachable to the fixture, the support structure holding the UV light source in alignment with the gripper pin when the support structure and the fixture are attached, the support structure being selectably detachable from the fixture, wherein the controller is attached to and supported by the support structure.

8. The apparatus of claim 7, the apparatus further comprising: a plurality of temperature sensors attached to the support structure, each of the temperature sensors being configured to detect a temperature of the corresponding UV light source, the temperature sensors being configured to inform the support structure controller of the detected temperature, the support structure controller being configured to control the illumination of the UV light sources based on the detected temperature or the support system controller is configured to implement an instruction from the control box to control the illumination of the UV light sources based on the detected temperature.

9. The apparatus of claim 6 wherein the workcell bus is configured to provide an electrical power to illuminate the UV light source when the bus connector is attached to the workcell bus.

10. An apparatus for adhesive fixturing of a work piece to a fixture, the apparatus comprising:
   a. an automated workcell configured to receive and retain the fixture and the work piece;
   b. a robot operably attached to the workcell and configured to place the work piece and the fixture in contact in a desired orientation, the fixture including a gripper pin configured to transmit UV light to a UV adhesive disposed between the fixture and the work piece when the fixture and work piece are in contact in the desired orientation;
   c. a UV light source, the UV light source being aligned with the gripper pin for selectable illumination of the UV adhesive through the gripper pin, the UV light source being operably connected to a bus connector;
   e. a workcell bus attached to the workcell, the bus connector being operably connectable to the workcell bus;
   f. a control box operably connected to the workcell bus, the emission of UV light from the UV light source through the gripper pin being controllable by the control box when the bus connector is operably connected to the workcell bus, wherein the fixture is a compound fixture comprising a first fixture and a second fixture, the first and second fixtures being attachable one to another, wherein the gripper pin is a first gripper pin and a second gripper pin, the first gripper pin is configured to transmit UV light to the UV adhesive disposed between the first fixture and the work piece, the second gripper pin is configured to transmit UV light to the UV adhesive disposed between the second fixture and the work piece, wherein the UV light source is a first UV light source and a second UV light source, the first UV light source is configured for selectable illumination of the UV adhesive through the first gripper pin, the second UV light source is configured for selectable illumination of the UV adhesive through the second gripper pin, the apparatus further comprising:
   g. a first support structure, the first support structure being selectably attachable to the first fixture, the first UV light source being attached to and supported by the first support structure, the first support structure holding the first UV light source in alignment with the first gripper pin when the first support structure and the first fixture are attached;
   h. a second support structure, the second support structure being selectably attachable to the second fixture, the second UV light source being attached to and supported by the second support structure, the second support structure holding the second UV light source in alignment with the second gripper pin when the second support structure and the second fixture are attached;
   c. the first and second UV light sources being operably connected to the bus connector so that the control box controls the operation of the first and second UV light sources when the bus connector is attached to the workcell bus.

11. The apparatus of claim 10, the apparatus further comprising:
   a. a first support structure bus attached to the first support structure and in communication with the bus connector, the first support structure bus being operably connected to the workcell bus when the first support structure is attached to the first fixture and the first fixture is retained by the workcell and the bus connector is attached to the workcell bus;
   b. a second support structure bus connector operably connected to the second UV light source, the second support structure bus connector being attached to the second support structure, the second UV light source being in operable communication with the first support structure bus when the second support structure bus connector is connected to the first support structure bus.

12. The apparatus of claim 11, the apparatus further comprising:
   a. a first support structure controller, the first support structure controller been in operable communication with the control box through the workcell bus when the bus connector is attached to the workcell bus, the first support structure controller being configured to selectably illuminate the first UV light source upon instruction by the control box;
   b. a second support structure controller, the second support structure controller being operably attached to the second support structure bus connector, the second support structure controller being in operable communication with the control box through the workcell bus when the second bus connector is connected to the first support structure bus and the bus connector is connected to the workcell bus, the second support structure controller being configured to selectably illuminate the second UV light source upon instruction by the control box.

13. An apparatus for adhesive fixturing of a work piece to a fixture, the apparatus comprising:
   a. an automated workcell configured to receive and retain the fixture and the work piece;
   b. a robot operably attached to the workcell and configured to place the work piece and the fixture in contact in a desired orientation, the fixture including a gripper pin configured to transmit UV light to a UV adhesive disposed between the fixture and the work piece when the fixture and work piece are in contact in the desired orientation;
   c. a UV light source, the UV light source having a configuration for selectable illumination of the UV adhesive through the gripper pin, the UV light source being operably connected to a bus connector;
   e. a workcell bus attached to the workcell, the bus connector being operably connectable to the workcell bus;
   f. a control box operably connected to the workcell bus, the emission of UV light from the UV light source through the gripper pin being controllable by the control box when the bus connector is operably connected to the workcell bus;
   g. a validation bus, the validation bus being separate from the workcell, the validation bus being configured to test the UV output of the gripper pin when the UV light source is connected to the fixture, the UV light source being configured to illuminate upon command through the validation bus when the bus connector is attached to the validation bus.

14. A method for adhesive fixturing of a work piece to a fixture, the method comprising:
   a. providing an automated workcell having a robot, a control box and a workcell bus, the control box being operably connected to the workcell bus, the workcell being configured to receive and retain the fixture and the work piece, the robot being operably attached to the workcell and configured to place the work piece and the fixture in contact in a desired orientation, the fixture including a plurality of gripper pins configured to transmit UV light to a UV adhesive disposed between the fixture and the work piece when the fixture and the work piece are in contact in the desired orientation;
   b. providing a plurality of UV light sources, each of the UV light sources corresponding to a one of the gripper pins, the UV light sources having a configuration for selectable illumination of the UV adhesive through the gripper pins when the fixture is retained by the work cell;
   d. providing a bus connector, the UV light sources being operably connected to the bus connector, the bus connector being connectable to the control box through the workcell bus when the fixture is retained by the workcell, the emission of UV light from the UV light sources being controllable by the control box when the fixture is retained by the workcell and the bus connector is connected to the workcell bus;
   e. providing a controller, the controller being operably attached to the bus connector, the controller being operably attached to the UV light sources, the controller being operably attached to the workcell bus when the bus connector is attached to the workcell bus, the controller not being operably attached to the workcell bus when the bus connector is not attached to the workcell bus, the controller being configured to selectably illuminate the UV light sources upon command by the control box when the bus connector is attached to the workcell bus;
   f. retaining the fixture by the workcell so that the bus connector is operably attached to the workcell bus and the control box;
   g. retaining the work piece by the fixture and placing the fixture and work piece in contact in the desired orientation by the robot;
   h. commanding by the control box that the UV light sources illuminate;
   i. projecting UV light by the UV light sources through the gripper pins to the UV adhesive disposed between the fixture and the work piece, thereby curing the UV adhesive and attaching the work piece to the fixture.

15. The method of claim 14, the method further comprising: attaching the UV light sources to the fixture when the fixture is not retained by the workcell so that each of the UV light sources is aligned with the corresponding gripper pin.

16. The method of claim 15 wherein the step of attaching the UV light sources to the fixture comprises:
   a. providing a support structure, the plurality of UV light sources and the bus connector being attached to and supported by the support structure;
   b. attaching the support structure to the fixture prior to retaining the fixture by workcell.

17. The method of claim 16 wherein the step of projecting UV light by the UV light sources through the corresponding gripper pins comprises:
   a. providing a support structure controller attached to and supported by the support structure, the support structure controller being in operable communication with the bus connector, the support structure controller being in operable communication with the UV light sources;
   b. receiving by the support structure controller of the command from the control box to illuminate the UV light sources, the support structure controller causing the UV light sources to illuminate in response to the command.

18. The method of claim 15, the method further comprising: validating the attached UV light sources and fixture prior to retaining the fixture by the workcell by attaching the bus connector to a validation bus, illuminating the UV light sources, and measuring the UV light transmitted through each of the gripper pins.

\* \* \* \* \*